US008719121B1

(12) United States Patent
Leason et al.

(10) Patent No.: US 8,719,121 B1
(45) Date of Patent: May 6, 2014

(54) SYSTEM AND METHOD FOR AUTOMATED CONSTRUCTION OF TIME RECORDS BASED ON ELECTRONIC MESSAGES

(76) Inventors: David Leason, Chappaqua, NY (US); Daniel Lubart, Thornwood, NY (US)

(\*) Notice: Subject to any disclaimer, the term of this patent is extended or adjusted under 35 U.S.C. 154(b) by 613 days.

(21) Appl. No.: 12/351,842

(22) Filed: Jan. 11, 2009

Related U.S. Application Data

(60) Provisional application No. 61/021,332, filed on Jan. 15, 2008.

(51) Int. Cl.
*G06F 15/02* (2006.01)
*G07C 1/10* (2006.01)
*G07F 19/00* (2006.01)
*H04M 15/00* (2006.01)

(52) U.S. Cl.
USPC ................................. 705/32; 705/34

(58) Field of Classification Search
None
See application file for complete search history.

(56) References Cited

U.S. PATENT DOCUMENTS

| | | | | |
|---|---|---|---|---|
| 5,628,004 A | * | 5/1997 | Gormley et al. | 1/1 |
| 7,143,091 B2 | * | 11/2006 | Charnock et al. | 1/1 |
| 7,774,408 B2 | * | 8/2010 | Sinha et al. | 709/206 |
| 8,135,950 B2 | * | 3/2012 | Parkinson | 713/156 |
| 2003/0193960 A1 | * | 10/2003 | Land | 370/401 |
| 2005/0065879 A1 | * | 3/2005 | Birch et al. | 705/40 |
| 2005/0187839 A1 | * | 8/2005 | Butera et al. | 705/32 |
| 2006/0084410 A1 | * | 4/2006 | Sutaria et al. | 455/408 |
| 2006/0104427 A1 | * | 5/2006 | Greenaae et al. | 379/126 |
| 2007/0100634 A1 | * | 5/2007 | Cooper et al. | 704/275 |
| 2007/0214068 A1 | * | 9/2007 | Tadepalli et al. | 705/34 |
| 2007/0226003 A1 | * | 9/2007 | Zapiec et al. | 705/1 |

\* cited by examiner

*Primary Examiner* — Ryan Zeender
*Assistant Examiner* — Ariel Yu
(74) *Attorney, Agent, or Firm* — Leason Ellis LLP

(57) ABSTRACT

Time record entries are automatically constructed using software modules and methods for presentation in response to prescribed interactions with email and other electronic messages in which there is a basis for recording a time-record. Heuristics are applied to parsed electronic messages to construct proposed time-record entries. The timekeeper has discretion whether to approve any proposed entries. Software tools are also disclosed to present and manage the automatically constructed time-record entries. The invention eliminates reliance upon the timekeeper to capture such activities as billable events in the first instance, and thereby can increase revenue opportunities. The same heuristics used to identify the entity to be charged for the activity can also be used to identify a logical path for storage of incoming and outgoing messages in a record management system.

10 Claims, 11 Drawing Sheets

From: Attorney_Joe@lawfirm.com
To: PSaunders@Freedom.com
Date: January 1, 2008 4:30:12 PM
Subject: Re: Status of The Gizmo?

710

720

700

Dear Patrick:

Larry and I spoke about one remaining issue and we will have a report to you later this week on the Gizmo.

Regards,

Joe

FIG. 7
(Prior Art)

TIME RECORD ENTRY IN TIME-ENTRY APPLICATION 160 AND/OR ACCOUNTING SYSTEM 180

810

| T-Keeper | Client | Matter | Date | Hours | Narrative |
|---|---|---|---|---|---|
| Attorney_Joe | Freedom | The Gizmo | 1/1/08 | 0.3 | Exchange emails with P. Saunders re: Gizmo |
| Attorney_Joe | Iobyte | Widget App. | 1/1/08 | 0.2 | Compose and send email to J. Smith re: widget application |

Widget 900A

| Hours/ Codes | Timer | Narrative | Never Bill | Link | No. of Messages {Chain} |
|---|---|---|---|---|---|
| 5540 | | Report Notice of Allowance to R. Verly | ☐ | Message-ID | |
| 0.2 ⇧⇩ | | Exchange emails with P. Saunders re: Gizmo | ☐ | 700 | 2 {300} |
| 0.1 ⇧ | | Review and Consider email from P. Saunders | ☐ | 300 | |
| 0.6 ⇩⇧⇩ | 0:35:42 | Telephone conference with D. Tracy | ☐ | | |

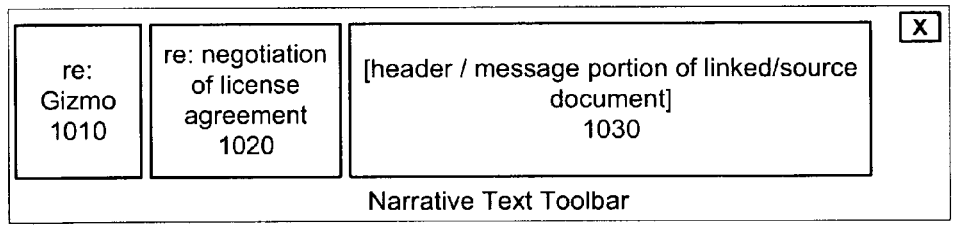

| re: Gizmo 1010 | re: negotiation of license agreement 1020 | [header / message portion of linked/source document] 1030 | [x] |
|---|---|---|---|
| | | Narrative Text Toolbar | |

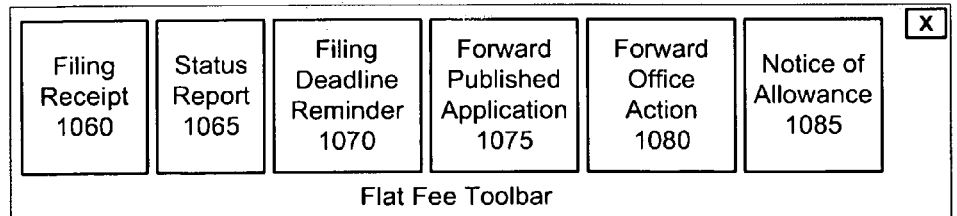

| Filing Receipt 1060 | Status Report 1065 | Filing Deadline Reminder 1070 | Forward Published Application 1075 | Forward Office Action 1080 | Notice of Allowance 1085 | [x] |
|---|---|---|---|---|---|---|
| | | | Flat Fee Toolbar | | | |

SYSTEM AND METHOD FOR AUTOMATED CONSTRUCTION OF TIME RECORDS BASED ON ELECTRONIC MESSAGES

This patent application claims the benefit of priority from U.S. Provisional Application Ser. No. 61/021,332, filed Jan. 15, 2008, entitled System and Method for Automated Construction of Time Records, which is hereby incorporated by reference in its entirety.

FIELD OF THE INVENTION

The present invention relates to the field of time record creation and management, and, more particularly, the invention relates to software modules for the automated construction of time record entries from events such as email messages, other electronic messages, files, and phone calls. The invention also relates to the software management of such automatically constructed time record entries.

BACKGROUND OF THE INVENTION

The proliferation of email messages has been accompanied by an increased burden on a professional's time, yet the time spent in reviewing and responding to emails is not being efficiently captured in time entry programs, if captured at all. Increased use of mobile email platforms has exacerbated this problem because time entry is not convenient and sometimes is not viable when away from one's office.

One popular time-entry program called Distributed Time Entry ("DTE") Enterprise is available from Advanced Productivity Software of Atlanta, Ga. DTE Enterprise integrates with leading time and billing (i.e., accounting) systems to streamline the accounting process, yet there remains a deficiency in that tools remain needed in the art to assist in spotting or identifying billable events in the first instance. The DTE "InHand" product supports time entry on BlackBerry® smartphones, but this tool merely validates entries and provides timers in the same way as has been done for years using desktop applications—with the user manually indicating that there is an event to bill.

Existing time-entry processes remain independent of email and other document management systems. One tool that is useful in gauging productivity is included in the Microsoft Office® suite of programs and is know as "Journal." Journal can track time spent on particular emails and documents, but does not construct a record that is useful in accounting or financial programs, nor does it perform the work to associate it with particular billable reference information. Rather, Journal is a historical log of what was touched and in that respect is a useful forensic tool for understanding how time is being spent on a computer.

A conventional arrangement of a mail system, a document management system, a time entry system, and an accounting system of an enterprise is illustrated schematically in FIG. 1. Each of these systems typically is accessible within a network. One or more mail servers 110 support standard communication protocols (e.g., SMTP) and are communicatively coupled to external networks. The mail servers receive and distribute emails including those that contain voice mail to desktop and mobile mail clients 120, 130, each of which is associated with a particular username. The mail servers can have additional functionality such as virus checking and centralized spam removal. The emails and voice mails can originate from within a local or wide area network of the enterprise or can originate at locations across a global distributed network such as the Internet. A telephony system 100 integrated to the enterprise's network in a conventional manner can carry telephone signals and voice messages in digital form.

The emails received by and sent from a given user remain in that user's email program unless moved to a public document management folder 150. To the extent that billable effort is spent in reviewing or responding to an incoming email or in connection with composing an outgoing email, the user ordinarily creates a time entry to capture that event in an accounting system 180. To do so, however, the user must identify the party to be charged and create the time record, which in turn typically requires interaction with a separate time entry application 160 and an enterprise database 170. In addition, a typical policy of many enterprises is to keep a copy of emails outside of the email program; however, such policies are frustrated because they create a burden on users to identify the appropriate path to which the file is to be saved and manually move or copy the message. That can be monotonous when many emails are involved and are to be filed in a great many different paths.

With respect to telephone calls, a timekeeper ordinarily records that event in a time-entry program, but the responsibility for doing so rests with the timekeeper and if the record is not created within a short time after the call, the event may not be billed at all amounting to a lost revenue opportunity. This is particularly keen when the timekeeper participates in a call while on a mobile phone or while not having access to a time-entry program.

Existing software has not automatically created time record entries based on heuristic analysis of messages, other electronic data and metadata, nor has any known system provided tools to assist a time-keeper in reviewing and importing such records from outside of a time-entry program into such a program. Moreover, with the advent of the present invention, new record management tools are needed to more effectively manage and audit automatically constructed time records for approval prior to entry into or release within a time entry program. Likewise, emails, their attachments, and other electronic documents must be properly filed within a public document management system, and yet heuristics and heuristic modules have not been deployed to address this problem in a practical way, particularly in conjunction with the concurrent creation of automated time-record entries. The present invention addresses these and other needs in the art of timekeeper record creation and management.

SUMMARY OF THE INVENTION

In accordance with a broad aspect of the invention, systems can be constructed and methods performed in which a timekeeper has proposed time record entries constructed automatically and presented for approval, modification or dismissal in response to a variety of prescribed activities in which there is a basis to believe that the timekeeper was being productive and such that a time-record for the activity might be appropriate. The activities principally include opening and reviewing emails, composing and sending emails, exchanging other messages and participating in telephone conferences. The proposed time record entries are presented to the timekeeper, and managed by various tools in accordance with further aspects of the invention, without requiring the timekeeper to initiate the record-creation process. Instead, the system and method present the timekeeper with proposed records and in this way can increase revenue opportunities by eliminating reliance on the timekeeper to capture the existence of the event in the first instance.

Furthermore, in connection with constructing proposed time entries, billing reference information is deduced which can be used to associate and store incoming and outgoing messages in satisfaction of an enterprise's record management policies, thereby leveraging the heuristic analyses being performed to record a billable event.

In accordance with one aspect of the invention, a system for automated construction of a proposed time record entry (PTRE) is described. The PTRE is constructed in response to user-driven events and with reference to a database of valid billing references. The system comprises a set of software modules. An email parser module is operative to extract syntactic structures from an email that is free of (i.e., lacks) information which encodes or includes a billing reference and therefore requires heuristic analysis to be matched to information in a database. An event handler module is operative to detect a prescribed interaction by a timekeeper with the email. A heuristic engine module is communicatively coupled to the parser and is operative to associate the email with a billing reference from the database using at least a portion of the extracted syntactic structures. An automated time-record entry generator module is operative to construct the PTRE for the timekeeper so as to include at least (i) the billing reference that has been associated with the email by the heuristic engine module, and (ii) information related to that email message. A user interface module is operative to present the constructed PTRE after the prescribed interaction has been detected, and is further operative to receive an instruction from the timekeeper to accept, modify or cancel the PTRE and to then output any accepted or modified PTRE.

If a PTRE is accepted or modified, when it is output it can be output as a time record entry included among other entries in a time entry application. This can be done, for example, when the PTRE is generated by software modules operating as part of or in concert with a particular time entry application. Alternatively, an accepted or modified PTRE can be output as a list of time records ready to be imported into a time entry application or to an accounting system. This may be the case, for example, when the PTRE is generated by an application executing independent of the time entry application (e.g., on a mobile device or on a desktop machine, including as an extension or plug-in for an email or other communication software package).

A system in accordance with the foregoing aspect of the invention can have at least one of the software modules executing on an email server while a remainder of the software modules executes on a client machine associated with the timekeeper.

The event handler module of the foregoing system can be operative to detect whether the timekeeper has opened or sent the email. These activities can comprise the prescribed interaction. Furthermore, the email parser module can be configured to extract syntactic structures in response to the event handler module having detected a prescribed interaction and not before that event. The heuristic engine module can produce a unique billing reference or a group of billing reference prospects, among which is the correct billing reference. In this case, the user interface module can present a PTRE together with the group of billing reference prospects and obtain a selection by the timekeeper of one of the billing reference prospects in the group to use as the correct billing reference in any outputted accepted or modified PTRE.

A system according to any of the above variants can have the automated time-record entry generator module operative to modify a previously constructed PTRE in response to a second, prescribed interaction. Second and, thereafter, subsequent prescribed interactions may be reported by the event handler module concerning a particular email message such as when the sender and recipient exchange messages in a common email thread.

Also, a system according to any of the above variants can further include a management module that is operative to automatically store the email in a public document management system in accordance with the billing reference that has been associated with any accepted or modified PTRE. As well, any attachments can be stored by the management module in accordance with the billing reference. By way of example, the billing reference can map to a folder or a folder and subfolder arrangement on a generally accessible storage device within the enterprise's computer network.

In accordance with another aspect of the invention, a method for providing a timekeeper with a PTRE constructed automatically by software executing on a computer is described which comprises executing first and second programs. The first program executes on a mail server and comprises an email parser operative to parse emails managed within the email program and to extract syntactic structures therefrom, and an event handler operative to detect a prescribed interaction with a particular email. The second program executes independent of the first program and comprises a heuristic engine, an automatic time-record entry generator, and a user interface. The heuristic engine is operative to associate each of a set of email messages in the email program with a respective billing reference from a database using at least a portion of the extracted syntactic structures including any email messages that themselves are free of information which encodes or includes said respective billing reference and therefore requires heuristic analysis to be matched to information in a database. (The particular email message that has been interacted with by the timekeeper is included in the set.) The automatic time-record entry generator is operative to construct the PTRE for the timekeeper so as to include, for each email message in the set, at least: (i) the associated billing reference, and (ii) information related to that email message. The user interface is operative to present the constructed PTRE for the particular email to the timekeeper after the prescribed interaction has been detected, receive an instruction from the timekeeper to accept, modify or cancel the PTRE, and output each accepted or modified PTRE.

A method in accordance with the foregoing aspect can also have one of the first and second programs include a management module operative to automatically store the email in a public document management system in accordance with the billing reference associated with any accepted or modified PTRE.

In accordance with yet another aspect of the invention, a method for providing a timekeeper with a PTRE that has been constructed automatically by software executing on a computer is described. According to this method, an email program having one or more email messages therein is monitored to detect a prescribed interaction with a particular email message, wherein the particular email is free of information which encodes or includes a billing reference and therefore requires heuristic analysis to be matched to information in a database. Each of a set of email messages in the email program is associated with a respective billing reference from a database. (The particular email message is included in the set of email messages.) The PTRE is automatically constructed for the timekeeper so as to include, for each email message in the set, at least (i) the associated billing reference, and (ii) information related to that email message. The automatically constructed PTRE for the particular email is presented to the timekeeper after the prescribed interaction has been detected.

An instruction is received from the timekeeper to accept, modify or dismiss the automatically constructed PTRE. The automatically constructed PTRE is then outputted in response to the instruction.

A method in accordance with the foregoing aspect of the invention can have the associating and constructing steps performed prior to the monitoring step having detected a prescribed interaction with any email messages in the set. This method can include additional steps that parse the email messages to output syntactic structures for each email message, process the syntactic structures using a heuristic engine having access to the database, and provide the billing reference from the heuristic engine for each email message for use in the associating step.

A method according to any of the above variants can have the heuristic engine further configured to identify a group of billing reference prospects and have the user interface present the automatically constructed PTRE for the particular email together with the group of billing reference prospects. The user interface obtains a selection by the timekeeper of one of the billing reference prospects and includes the selected billing reference prospect as the billing reference in the outputting of any automatically constructed PTRE.

A method in accordance with the foregoing aspect of the invention can also include the additional step of automatically storing the email in a public document management system in accordance with the billing reference associated with any accepted or modified PTRE.

In accordance with still another aspect of the invention, a system for automated construction of a PTRE is disclosed which responds to a telephone call with a timekeeper and which includes several software modules. A mobile telephone interface module is operative to receive from a wireless device and write to a memory of a machine a call-log having telephone call information. A parser module is operative to extract the telephone call information from the memory. A heuristic engine module is communicatively coupled to the parser and is operative to associate the telephone call with one or more billing references from the database using at least a portion of the extracted telephone call information. An automated time-record entry generator module is operative to construct the PTRE for the timekeeper so as to include at least any billing reference that has been associated with the telephone call by the heuristic engine module, and a portion of the telephone call information. A user interface module is operative to present the constructed PTRE, to receive an instruction from the timekeeper to accept, modify or cancel the PTRE, and to output any accepted or modified PTRE in response to the instruction.

In the foregoing system, the mobile telephone interface module more generally can be a call-interface module that is operative to receive telephone call information and to write the telephone call information to a memory of a machine. This module can be a WAP interface operative to include the call-log in the memory. The mobile telephone interface module can receive IP data packets, wherein the data packets include the call-log. Variations can have J2ME Midlets, WAP over UDP, TCP data packets or SOA. The mobile telephone interface module can be further operative to assemble and unload the data packets or otherwise cause any transmitted data records to be inserted into the call-log in the memory to thereby reconstruct the call-log in the memory, as noted above. As well, the mobile telephone interface module can be operative to receive from the wireless device and write to the memory of the machine either an email or an SMS which carries the call-log having the telephone call information for processing by an email parser.

Also, in the foregoing system, the heuristic engine module can be operative to associate the telephone call with a group of billing reference prospects, among which is the billing reference. In this case, the user interface module can be further operative to present the constructed PTRE together with the group of billing reference prospects, to obtain a selection by the timekeeper of one of the billing reference prospects in the group, and to include the selected billing reference prospect as the billing reference in any outputted accepted or modified PTRE.

Also, in the foregoing system, the automated time-record entry generator module can be operative to modify a previously constructed PTRE for the timekeeper in response to the parser module extracting a second telephone call which is distinguishable from the telephone call based upon examination of the telephone information in the call-log.

A system in accordance with the foregoing aspect of the invention can also have at least one of the software modules executing on an email server while a remainder of the software modules executes on a client machine associated with the timekeeper.

These and other features, aspects and advances embodied by the concepts described herein can be further appreciated with regard to the description of certain embodiments thereof and the accompanying drawing figures.

BRIEF DESCRIPTION OF THE DRAWING FIGURES

FIG. 7 is a conceptual illustration of an email message sent in reply to the email of FIG. 3.

FIG. 8 is a conceptual illustration of time-record entries within a time-entry application or an accounting system, including entries related to the reply email of FIG. 7.

FIG. 9A is a detail view of a portion of the widget of FIG. 9, showing further optional features.

FIG. 10A is a detail view of a narrative text toolbar that may be presented as part of the software widget of FIG. 9.

FIG. 10B is a detail view of a flat fee toolbar that may be presented as part of the software widget of FIG. 9.

DETAILED DESCRIPTION OF CERTAIN EMBODIMENTS OF THE INVENTION

By way of overview and introduction, many professionals charge for time spent reviewing and commenting on materials that are provided by email and for participating in telephone conferences. To charge for such time, careful records have to be kept to document such effort. Some of this time may be spent while interacting with a mobile device. To better capture such effort, software is provided which associates individual emails and phone calls with particular clients and matters to be billed and thereafter automatically constructs prototype time record entries that can be selectively posted to or within a time entry program. In this way, revenue opportunities can be more completely captured while providing the time keeper with full discretion as to whether an email or phone call, in fact, warrants a time record entry. Regardless of whether time is spent on a message or a phone call or whether the event occurs on a mobile platform, a desktop machine or a remote connection, the user is ultimately prompted to review, modify, approve, or dismiss time-record entries that are automatically-constructed in accordance with one aspect of the invention. The terms "user" and "timekeeper" refer to the same person throughout this Specification.

Meanwhile, if the effort concerns an email that was reviewed or composed, it can be filed in a public document management system together or concurrently with the filing of any attached documents, using the same association that has been discovered in order to construct the time-record entry. As a result, emails and other documents can be automatically filed using that same association without requiring further user intervention.

Figure 1:
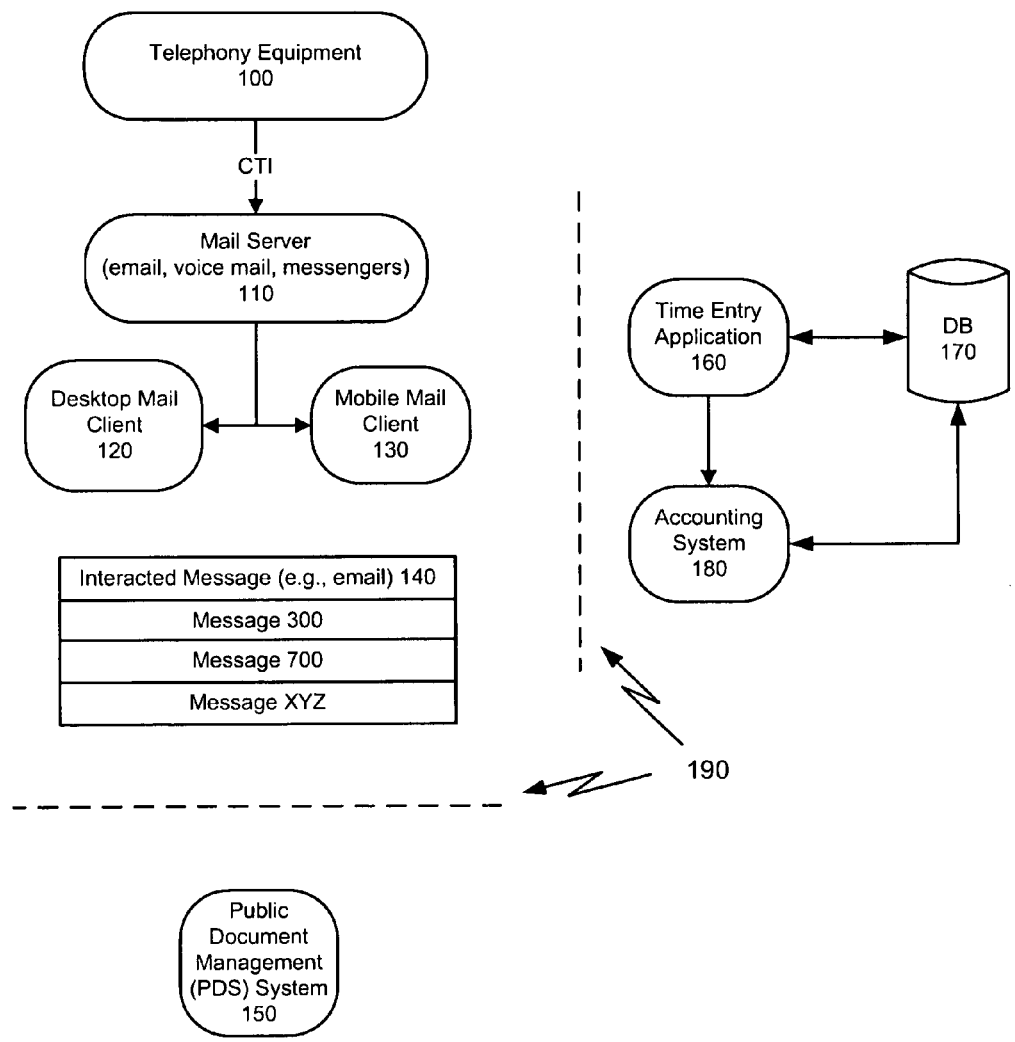
FIG. 1 illustrates a prior art arrangement of systems commonly found in a computer network of an enterprise.

These benefits are achieved, in part, using a heuristic module and an automated time record entry generator, arranged as described herein. These components operate to connect systems such as shown in FIG. 1 on the basis of prescribed interactions such as certain interactions with messages (e.g., email 140) and certain phone calls. In the case of a message, the message is parsed for terms that drive the heuristic engine and enable or at least assist in uniquely defining the message's relation to validated clients and existing data paths within the enterprise. In the case of telephone calls, caller and called-party identifications are used to drive the heuristic engine in a similar manner. In these ways, the present invention bridges email and other messaging platforms with document management and time-entry systems in a novel way and thereby lessens the isolation 190 that has pervaded data networks for decades.

Figure 2:
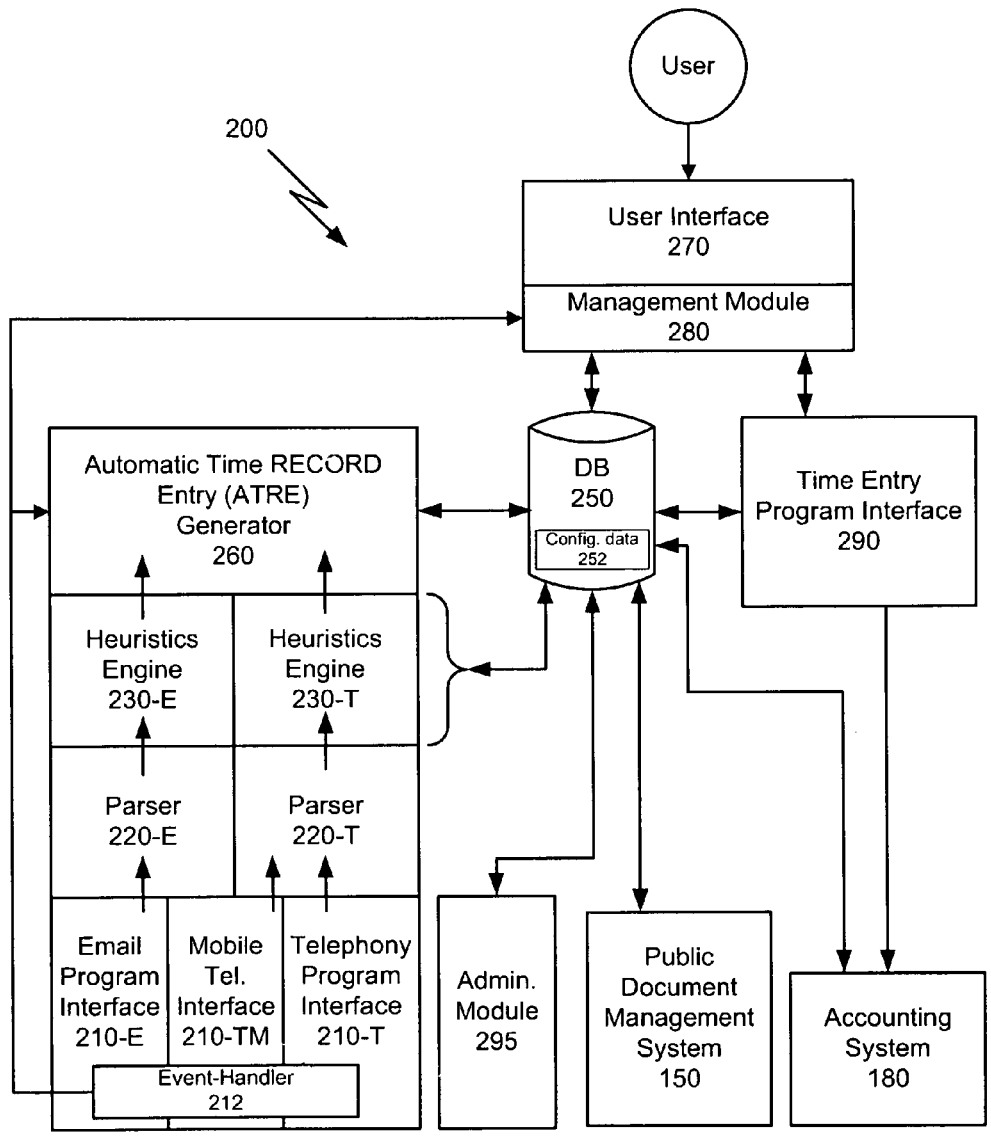
FIG. 2 is a functional diagram of software modules and systems that capture, process, and transform data in accordance with the invention.

Referring now to FIG. 2, a process stack comprising a series of software modules schematically illustrates an approach to bridging email, document management and time-entry systems in accordance with an aspect of the present invention. The software modules cooperate to extract and process information from events such as email and other messaging activity, telephone calls on mobile or land-line equipment, and potentially other events including saving a document to a document management system. At the lowest level, a parser software module 220 ("parser") communicates with various resources on the enterprise's network through an application protocol interface (API) of each such application.

The APIs of the respective applications on the enterprise's network form no part of the present invention. Rather, the parsers 220 are adapted to communicate with each such API.

There can be multiple parsers 220, depending on how many applications are being bridged. Thus, as shown in FIG. 2, there is a parser 220-E that communicates with an email program interface 210 to an email program such as Microsoft Exchange or Microsoft Outlook, and a parser 220-T that communicates with a telephone program interface 210-T, such as Cisco Unified Call Manager Express TSP 2.1. FIG. 2 shows two parsers, but it should be understood that an arbitrary number of parsers can be provided to extract information from as many applications as required. In this specification, the parsers are more generally referred to herein as parser(s) 220, unless details of a particular parser are being described.

The parsers 220 operate to manage data made available through a given API and present it in chunks that can be processed by the next process in the stack. The parsers 220 receive data through the program interface in one or more standard formats (such as SGML, HTML, XML, delimited-text and text) and extract data that are useful in identifying the billing reference information and in determining a narrative to describe the event. Thus, parser 220-E communicates with an email program interface and can identify and output syntactic structures such as (a) the email address, (b) a domain, (c) properties of the sender embedded in the message, (d) a subject line, (e) uncommon words based on dictionary look-ups, and (f) other embedded information including status flags. For example, parsing an email such as email 300 in FIG. 3 could result in the following corresponding syntactic structures: (a) "PSaunders@Freedom.com," (b) "Freedom," (c) "Patrick Saunders," (d) "Status of the Gizmo?," (e) "Gizmo," and (f) a particular Message-id, e.g., 8794792F3B64409A25AC524A896@www.iobyte.net, or in some cases an embedded client/matter identifier or hash value, and the status flag: "message read". The parser can also potentially identify message parameters such as "This is a reply" if such information is available from the email program. The interface 210-E can send incremental messages as well, such as changes in the status flag from "message read" to "message deleted," etc.

The parser preferably includes an event-handler module 212-E that is arranged to synchronize with the email server such that any changes in status flags maintained by the email server prompt the parser to extract data for processing by the remaining layers in the stack. Such synchronizing is conventional, and can be by polling the server for changes or by changed-status pushes from the server or by reading the status flags of messages associated with any given email account. For instance, Microsoft Outlook clients synchronize with a Microsoft Exchange server so that messages will have the same status on the client and server, such as, if a particular email was opened on the client it will be marked as having been opened at the server, and so on for other actions on email messages. Likewise, the Blackberry Exchange Server synchronizes mobile devices registered with that server with any status changes at the Microsoft Exchange Server.

Parser 220-T can communicate with resources available on the enterprise's network through a computer telephony interface (CTI) using a standard protocol such as Microsoft TAPI or a different telephone API in order to identify and output syntactic structures. A telephone service provider interface (TSPI) driver, typically provided by the hardware manufacturer of the telephony equipment, can be installed and configured on the user's workstation, on the user's mobile device or on centrally located telephony equipment 100 (e.g., the server) in the case of a third-party TAPI implementation. The telephone equipment can include a private telephone exchange (PBX) within the enterprise or a server that manages messages to and from the mobile devices (e.g., a Blackberry Enterprise Server). Using TAPI, calls made through the telephony system 100 carry information concerning the status of the telephone handset and call related information such as CallerID (CLI/ANI) and DDI (MSN/DNIS)—sometimes included as LINECALLINFO values, and these can be identified and outputted by the parser 220-T. As an example, parser 220-T can identify and output, without limitation, caller ID information, MAC/Device ID of the telephone deskset, the time a call commenced, and its ending time or duration since the start time. The date, if not provided by the CTI interface, can be supplied by a process higher up in the stack.

In the case of a mobile device such as a Windows-based or Blackberry® smartphone phone (i.e., a wireless device having email, text messaging, instant messaging, web browser and other communicative functionality), a mobile telephone interface module 210-TM can comprise a driver and low-footprint application installed on the mobile device and executing in the background which is operative to transfer the same types of information to a parser configured to handle data concerning mobile telephone calls, such as may be provided from a call-log. A typical call-log can identify the telephone number of the calling or called party, the date and time of the call, a name from ANI data or from a contact list, a type of call (e.g., placed, received, or missed), a duration if the call was successful, and an indication as to whether a call attempt was aborted (e.g., a status) or whether it failed (e.g., an error condition). The call-log information can be conveyed by an application executing on the mobile device (a call-log transfer module) to a machine, such as the machine running the process 500B, for processing by a suitable parser. The contents of the call-log comprise telephone call information that is written to a memory and accessible by the parser for data extraction.

As one example, the call-log information can be transmitted from each mobile device by pushing one or more datagrams consisting of inbound and outbound call records since the last message had been sent, through the carrier network via a transport protocol such as TCP or UDP to a server listening on a specific port for these messages. For example, the data pushes can be at regular intervals.

In part, the WAP interface is operative to receive data packets from the mobile device which include the call-log data. When the mobile telephone interface module 210-TM is a WAP interface, it assembles the packets so that their payloads/content can be unloaded into the memory. Preferably, the call-log maintained on the mobile device is generally reconstructed at a machine executing within the enterprise's network so as to once again resemble the call-log.

As another example, the call-log information can be transferred within an email or an SMS message, detected by the event-handler module and acted upon/handled by the parser 220-E. As such, all inbound and outbound calls can be captured for processing by the parser 220-E, though if the call-log information is already separated by fields, the parser may simply operate to arrange or confirm that the information is in a standard format for processing at the next stack level.

Thus, for example, the parser 220 can identify and output, without limitation, caller ID information, MAC/Device ID of the mobile smart-phone, the date and time that the call commenced, and its duration. Meanwhile, any message that sends call-log data for processing by the parser can be auto-deleted from the sent messages on the mobile device so as to not distract the user and to prevent that sent message from being a basis for a time-entry record (see blocks 612, 613 of FIG. 6). It should be understood that the same call-log data is typically maintained by the telephone service provider (TSP) used by the mobile device. The call-log data, therefore, may be conveyed from that source instead, if desired. All that is important in this regard is that the mobile telephone interface 210-TM make available to a parser a minimum set of information concerning telephone usage so that the need for a time-record entry can be identified and acted upon automatically. When the driver and application are on the mobile device, then the rate of message conveyance should be selected in view of conflicting criteria such as the desirability of having the call information available quickly verses the additional demands the application places on the mobile device. Generally, it is anticipated that one call-log message should convey call-log data for more than one call or be sent before the close of business on that same day.

The inputs received by the parsers from various APIs can vary and may require customization to be compatible with a given interface. The output information, however, can be standardized so that a general purpose heuristics module can operate starting at the next stack layer, namely, a heuristics engine software module 230 ("heuristic engine"). For example, a single engine 230 can be configured to handle the output of several different parsers, such as an email parser, an SMS parser, and so on. Additional engines such as engine 230-T can still be provided, if necessary, to operate upon other events such as telephone calls. In this specification, the heuristic engines are more generally referred to herein as engine(s) 230, unless details of a particular heuristic engine are being described.

The parsers 220 output information to heuristics engines 230 associated with each respective parser. The heuristic engine principally operates to match or assist in matching the extracted information from the parser to valid billing reference information in the accounting system 180, in the document management system 150, or in both systems, and to disregard events that its rule-base indicates are not to be processed into time-record entries. The billing reference identifies the particular account to be billed for any professional review, handling, or advice relating to the message or call that has been parsed. In some organizations, the account to be billed is identified by a client number and a matter number for that client. The client/matter relationship can be one-to-many. Other organizational structures can have accounts arranged in a different relationship. More generally, a particular account to be billed is referred to in this Specification as a "billing reference." The billing reference can also refer to an account that accumulates charges that are not billable to anyone, but which are to be tracked nonetheless. Both billable and non-billable accounts are encompassed by the term "billing reference," as used in this Specification. All that is important in this regard is that the billing reference be compatible with information used by a time entry program to log the time-records of timekeepers into its database, the database of an accounting system, or both.

There can be one heuristics engine configured to receive document- or message-related information 230-E and another heuristics engine 230-T configured to receive CTI information, as shown. Alternatively, a common engine can pre-process the parsed information to determine its source and then process the parsed information in view of the source of the information. The heuristics engine can operate upon the parsed data using algorithms and rules contained within the software module 230 or accessed from another resource such as a database table entry. In addition, the heuristics engine can access other enterprise resources such as a database of valid entries in the accounting system, which can be included in a database 250 or elsewhere. Optionally, the engine can access any recently released time entries associated with that timekeeper. The heuristics engine can take into account other information as well. For instance, the engine may utilize information it has stored based upon previous processing operations it has done for that timekeeper, e.g., using information stored in a database table. As another example, the engine can utilize information that is or has been provided through a user interface 270 (e.g., the "never bill" information, discussed below) in connection with the present or a prior processing transaction such as can be made available by a widget 900 (see discussion of FIG. 9) to filter the events that otherwise would propagate to the next stack level. Thus, certain emails if associated with "never bill" transaction can be filtered so as to not be provided to the ATRE generator, discussed next. Likewise, the heuristic engine can have a rule base for processing telephone calls so as to filter out calls that are less than a threshold period of time, say, 30 seconds or 4 minutes, or to filter out calls whose status indicates that the call was missed, received but not answered, received but sent to voicemail, aborted or failed.

In the next stack layer, an automated time record entry (ATRE) generator 260, also constructed as a software module, is configured to accept information from the heuristic engine 230 and to construct time-records entries. A time record entry (TRE) can include a number of fields such as shown in the middle column of the table below. Sample values for a single TRE are shown in the right column.

| Record format | | |
|---|---|---|
| Field No. | Field Name | Value |
| 1 | Client | <u>1234</u> |
| 2 | Client Name | Freedom |
| 3 | Matter | <u>56789</u> |
| 4 | Matter Name | The Gizmo |
| 5 | Hours | <u>0.2</u> |
| 6 | Narrative | Review <u>and</u> Consider <u>email from P. Saunders</u> |
| 7 | Status | — |
| 8 | Billable | Yes |
| 9 | Work Date | Jan. 1, 2008 |
| 10 | Time Keeper | Attorney_Joe |
| 11 | Operator | Attorney_Joe |
| 12 | Tax Code | 0 |
| 13 | PTO Code | — |
| 14 | Flat Fee Code | — |
| 15 | Released | — |
| 16 | Release Date | — |
| 17 | Converted | — |
| 18 | Convert Date | — |
| 19 | Link | Message-ID |
| 20 | Prior Associations | Set of Message-IDs |

The conventional manner for constructing a TRE is to manually identify the matter (or both the client and the matter if the matter is not uniquely assigned), the hours worked, and a narrative. These manually-entered fields are shown in underline in the right column above. The other fields in the TRE can be automatically filled by the time entry program, but the conventional process requires the time-keeper to pause what he or she is doing and construct a new TRE, or construct a new TRE sometime after effort has been made, e.g., in connection with the review of an email in order for the billable event to be captured at all. If the user does not inform the time-entry program of the event, the revenue opportunity passes without being identified and without further reminders.

As a departure from such conventional approaches, the ATRE generator 260 can initiate a proposed TRE ("PTRE" or "proposed TRE") and establish values for each of the required fields without user intervention. As a result, revenue opportunities are increased, and the PTREs are presented to the user through the user interface 270.

The ATRE generator 260 receives analyses output by the heuristics engines 230 and constructs or alters previously constructed time records in response to the events being reported to it. In addition, the ATRE generator can be in communication with application interfaces 210 to receive changes in status flags and instruct the event handler 212 as to how it is to handle the event. For instance, communication with the email program interface can provide the ATRE generator with messages such as "opened," "reply," "forward," "sent" as well as various auto-reply messages (e.g., due to an out-of-office assistant, receipt-acknowledgement, or read-receipt).

The ATRE generator can have associated timekeeper configuration data 252 that can influence the values included in any PTREs as well as whether the PTRE is constructed in the first place (e.g., the ATRE generator does not construct or output records for "never bill" events, or for events that are not deemed as qualified interactions). The timekeeper configuration data 252 can store default values for ATRE data fields as well as preferences such as selections previously made by the timekeeper in accepting, modifying, or dismissing proposed TREs. A sample configuration data record for a timekeeper is shown in the table below.

| Configuration Data | | |
|---|---|---|
| Type | Field | Value(s) |
| Default | Timekeeper | Attorney_Joe |
| Default | Hours | 0.1 |
| Default | Time Increment | 0.1 |
| Preference | Never Bill | {family.com, spouse_name, Freedom:MSG_Type = Internal} |
| Preference | Flat-Fee Codes | {FR, NOP, NOA} |
| Preference | Narratives | {(matter-ID #1, [released text #1], [released text #2]), ... } |
| Preference | Historical Matches | {(client #1, [matter #1, m#2, m#3]), (c#2, m#1), (c#3, [m#1, m#2]), ... } |
| Preference | Field Chooser | Exclude (Timekeeper, Date, timer, No. of Messages {Chain}) |
| Preference | Prior Dismissal Notification Threshold | 9 |

The timekeeper configuration data is also a resource that can be used by the heuristics engine and can cause different actions for different timekeepers. As such, the timekeeper configuration data 252 can be maintained as a table in the database 250 or in another database or can be a file.

A critical component of a time record entry is the billing reference. If the heuristics engine 230 has uniquely identified the billing reference information, then Fields 1-4 in the record format above can be automatically completed. On the other hand, the timekeeper may have to be prompted in order for a unique billing reference to be identified. In that case, the ATRE generator 260 can either prompt the timekeeper through a user interface 270 or store an indeterminate set of billing reference prospects for selection by the timekeeper (e.g., the two prospects 920 for the matter field of one of the proposed records shown in FIG. 9). A process that explains this is described in connection with FIG. 5 below.

Another key component of the time-record, normally input manually, is the amount of work that was performed in connection with the event, typically input in terms of time, but which can be expressed as a flat-fee code (discussed later). The ATRE generator can insert a default value from the timekeeper's configuration data 252. The configuration data can have a value such as "0.1" as a nominal, non-zero minimum amount to bill for any PTRE that is constructed. Another setting in the configuration data 252 can be a default time increment that is used by the ATRE generator for constructing a PTRE when the event comprises a further transaction relating to a prior event, such as a reply or forwarding of a message received and interacted with earlier in the same day). The values from the configuration data 252 enable the ATRE generator to populate the hours-worked field on an automated basis, yet the timekeeper retains discretion as to which events are suitable for billing after reviewing, modifying, accepting, or dismissing each proposed TRE.

Yet another key component of the time-record is the narrative field. This too has normally been input manually, though codes have been made available to assist entry once the timekeeper has manually opened a new record for creation using generic narratives. For instance, a code such as ".RRC" can be converted into the plain text phrase "Review and report communication from _____." The ATRE generator can construct a narrative using the outputted information from the heuristics engine and can populate the field with a draft narrative that is complete in its text. For example, if parser 220-E has operated on the email of FIG. 3 and the heuristics engine 230 has identified the email sender as P. Saunders, then the ATRE generator can construct a narrative such as "Review and consider email from P. Saunders," as shown in record 410 of FIG. 4, without further intervention from the timekeeper. Similarly, if the email included attachments that were opened by the timekeeper, then a similar email can be constructed yet have a narrative automatically constructed without user assistance such as "Review and consider email and attachments from P. Saunders," as shown in record 420 of FIG. 4. A narrative text toolbar 1000 (see FIG. 10A) can provide for selection previously accepted time record narratives or narrative-field portions 1010, 1020, and optionally can show the parsed header or message portions 1030 of the event (e.g., email) that is the basis for the proposed TRE. As another example, if parser 220-T has operated on a telephone message and the heuristics engine 230 has identified the called party as P. Saunders, then the ATRE generator can construct a narrative such as "Telephone conference with P. Saunders," as shown in record 430 of FIG. 4, without further intervention from the timekeeper. On the other hand, the timekeeper has discretion as to whether the proposed entry is to be released to the time-entry or accounting system, and as to whether the narrative should be edited, say, to be more specific. Optionally, the user interface can position a cursor within a text box containing the proposed narrative for each PTRE that is constructed before it is approved for posting to a further program or routine.

Optionally, the ATRE generator 260 can associate additional data with the time-entry record to assist the timekeeper in auditing and reviewing each proposed TRE. Such additional data can include the text of, or a link to, the email, message or other record of the event that prompted the PTRE to be created. In this regard, the parser 220 provides information to the heuristics engine which is passed upward to the ATRE generator for inclusion in the proposed TRE that has been automatically created. The timekeeper can interact with the information through the user interface 270, such as by selecting the link, and inspect the basis for the PTRE. The user interface also can show the messages and documents concerning earlier events that relate to the particular event that is described in the proposed TRE. Once the timekeeper is satisfied that he or she understands the basis for the entry, he or she can confirm it, modify it, or dismiss it.

If the PTRE has been confirmed or modified, then it is output to a further program or routine for handling, as noted above. On the other hand, if the PTRE is dismissed, it will not be the basis of a time record that is included on a client bill.

At the top of the stack is the user interface. The user interface 270 provides an interactive presentation to the timekeeper of one or more PTREs, and can be the front end to a management module 280 that instructs the ATRE generator 260 with regard to certain operations such as modifications to the proposed TRE and to the timekeeper's configuration data. Details of the user interface 270 are described with reference to FIGS. 9 and 10 below. Briefly, however, the UI 270 includes editing functionality so that a user can review, modify, approve or dismiss any particular entries. The interface could be a part of the time entry program itself, as would be the case if the heuristic engine 230 and ATRE generator 260 were integrated into the time entry program. In the implementation described herein, the user interface is independent of the time entry program and operates as a widget 900 to create a file or database table that can be imported into the time entry program, either directly or as a result of a transformation in to an importable data stream.

The management module 280 implements settings and actions based on events reported by the event-handler 212 or from user commands through the user interface 270. If status change information is provided from the email server through the event-handler 212, the management module can intervene before action by the ATRE generator 260 or can override any action already taken by the ATRE generator 260 in connection with revisions to the narrative field or other fields (e.g., the hours field) of a previously constructed PTRE. Commands to save the email message to the PDS 150 can also be implemented through the management module.

Once the timekeeper has confirmed any proposed TREs, they may be posted to the time entry application 160 through the time entry program interface 290 for conveyance to the accounting system 180 which creates invoices based on released time records. If the user interface 270 is part of a stand-alone application such as widget 900, then posting the confirmed entries may require a manual step of importing an output file or table to the time entry application. Optionally, an administrator module 295 can sweep a database such as database 250 for output files or tables generated by any timekeeper of the enterprise, which are now centrally stored, and combine these data so that all confirmed records can be imported as a batch with no further effort on the part of any particular timekeeper. In other words, the timekeeper would not have responsibility for importing the confirmed entries. Also, unconfirmed records can be purged, if desired. In addition, because the administrative module has access to the database 250 and to each timekeeper's configuration data, the administrative module can be configured to generate and/or provide reports to an authorized user, such as a managing partner or other persons authorized to review the timekeeping activities of other timekeepers. Reports that can be provided by the administrator module 295 can include raw and statistical information concerning the number or percentage or which PTREs in particular have been confirmed or gone unconfirmed by a particular timekeeper. In this way, the administrator module 295 can provide management with information concerning the behavior of a particular timekeeper in respect to PTREs that were dismissed. Because dismissed PTREs were automatically created by the system 200, new data exists for reporting to management that is not part of the conventional paradigm. In the conventional enterprise that tracks time (e.g., a law firm), if the time record was not created in the first instance, management would not know of the lost revenue opportunity. In the present invention, because the system maintains in the database 250 each PTRE, even if the timekeeper exercises his or her discretion in electing to dismiss the PTRE, management will have an opportunity to review that timekeeper's decision(s) and any patterns concerning the dismissed PTREs (e.g., whether a large number is associated with the same email address or a particular domain) so as to take any action that it deems appropriate using this newly-acquired business intelligence. As such, management has a novel tool provided through the reporting function of the administrator module 295.

Figure 5:
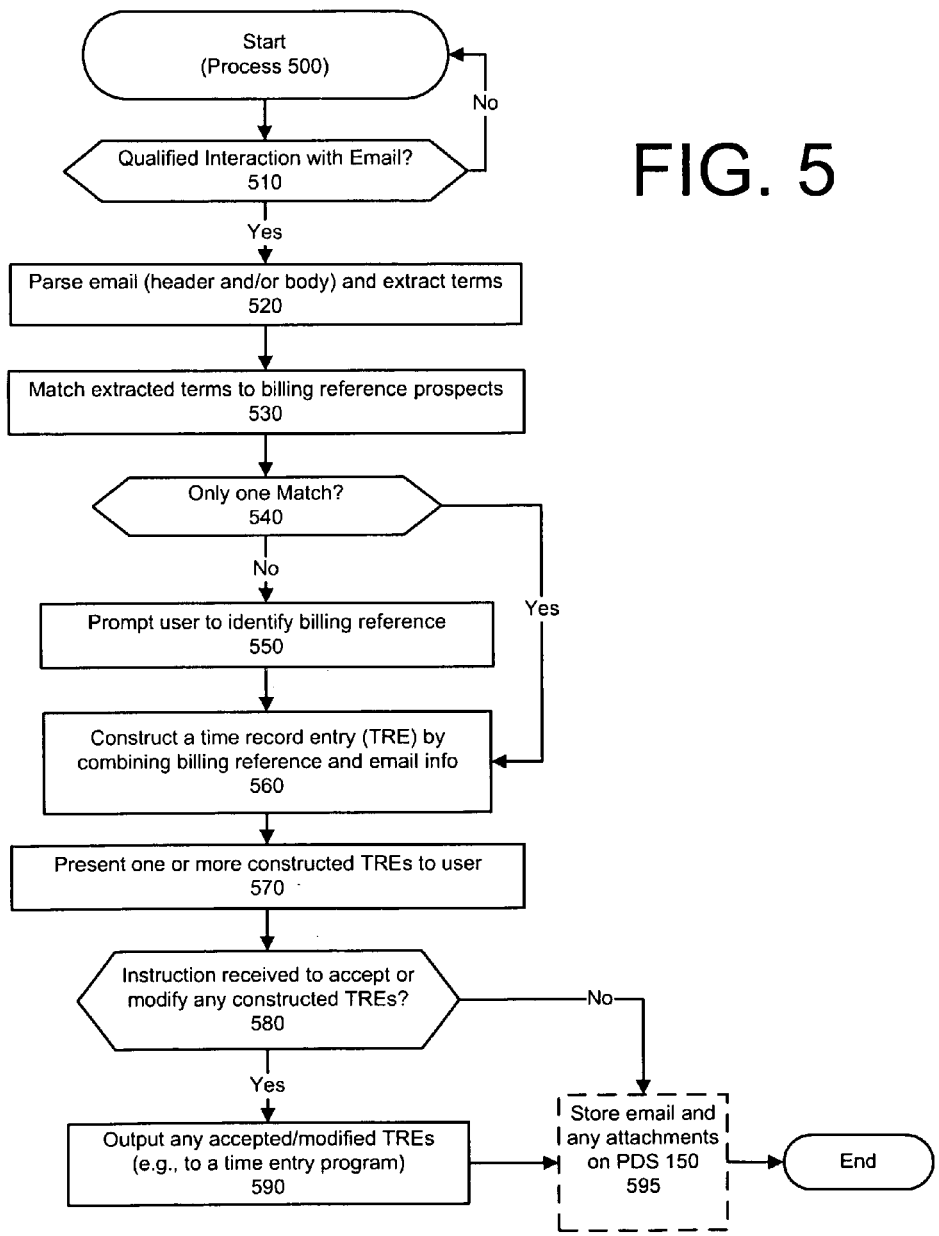
FIG. 5 is a flow diagram illustrating a process flow that automatically constructs time-record entries based on qualified interactions with email messages in accordance with an embodiment of the invention.
Figure 5A:
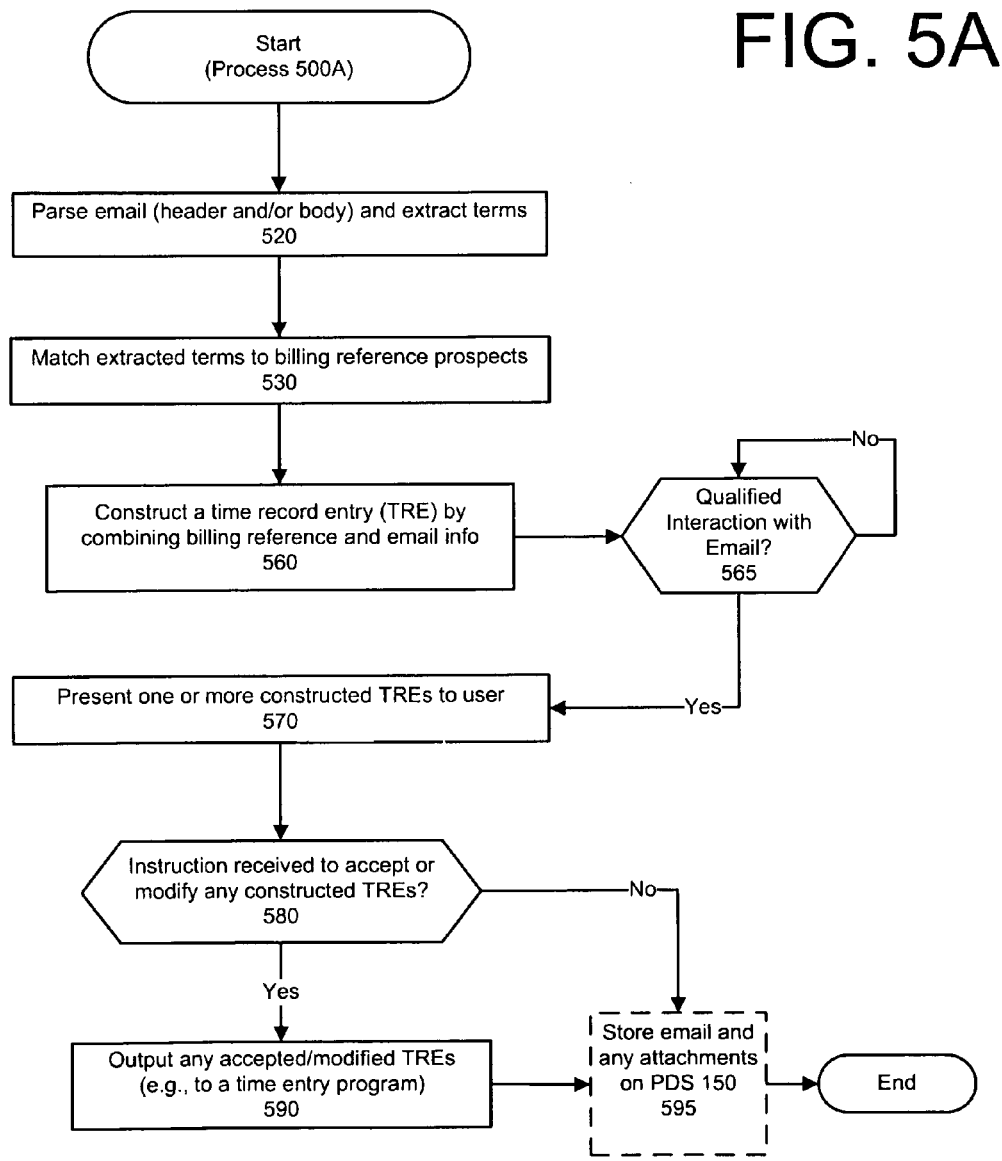
FIG. 5A is a flow diagram similar to FIG. 5 in which the process proceeds in anticipation of a qualified interaction with the email message.
Figure 5B:
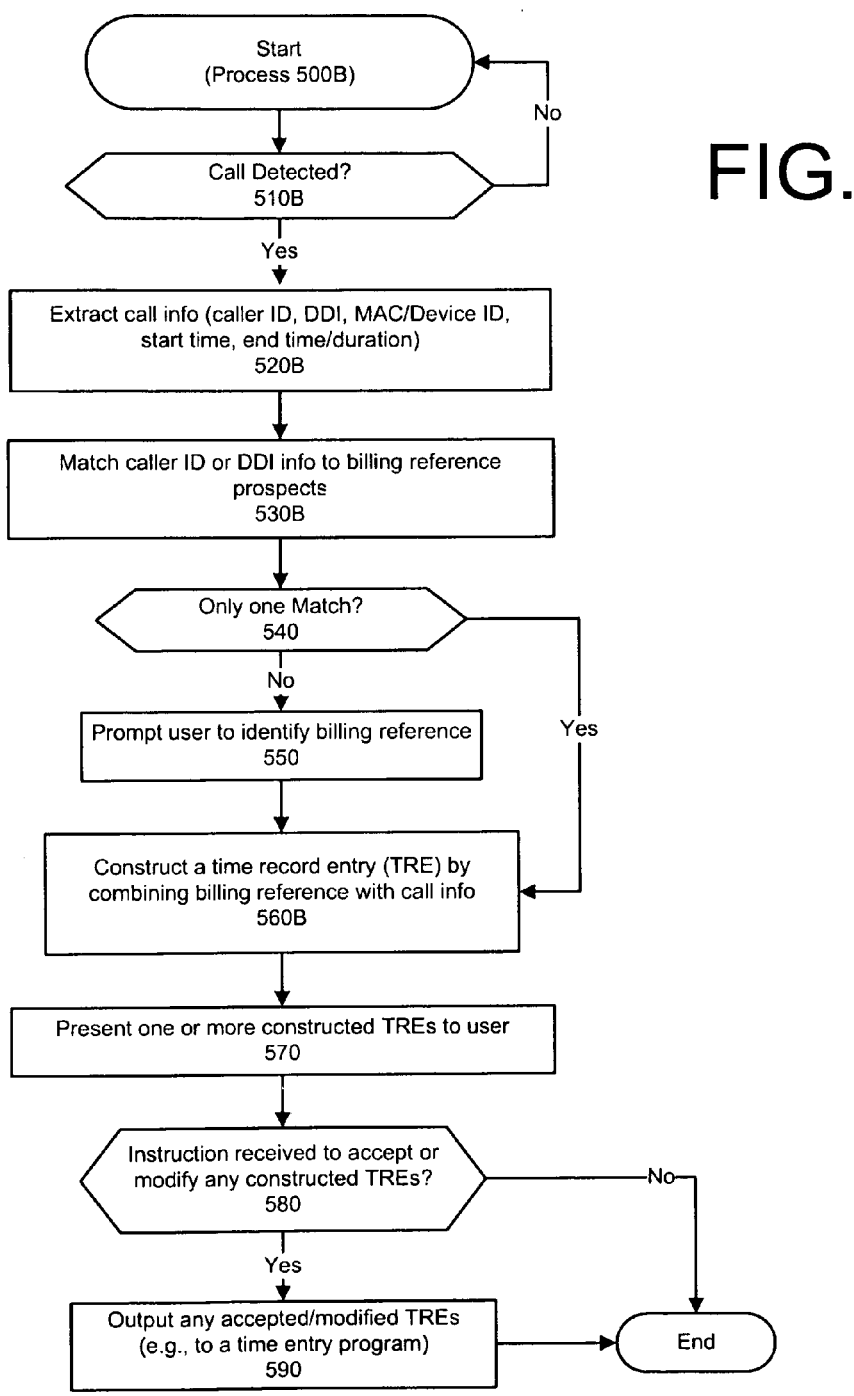
FIG. 5B is a flow diagram similar to FIG. 5 but adapted to automatically construct time-record entries based on telephone calls in accordance with an embodiment of the invention.
Figure 6:
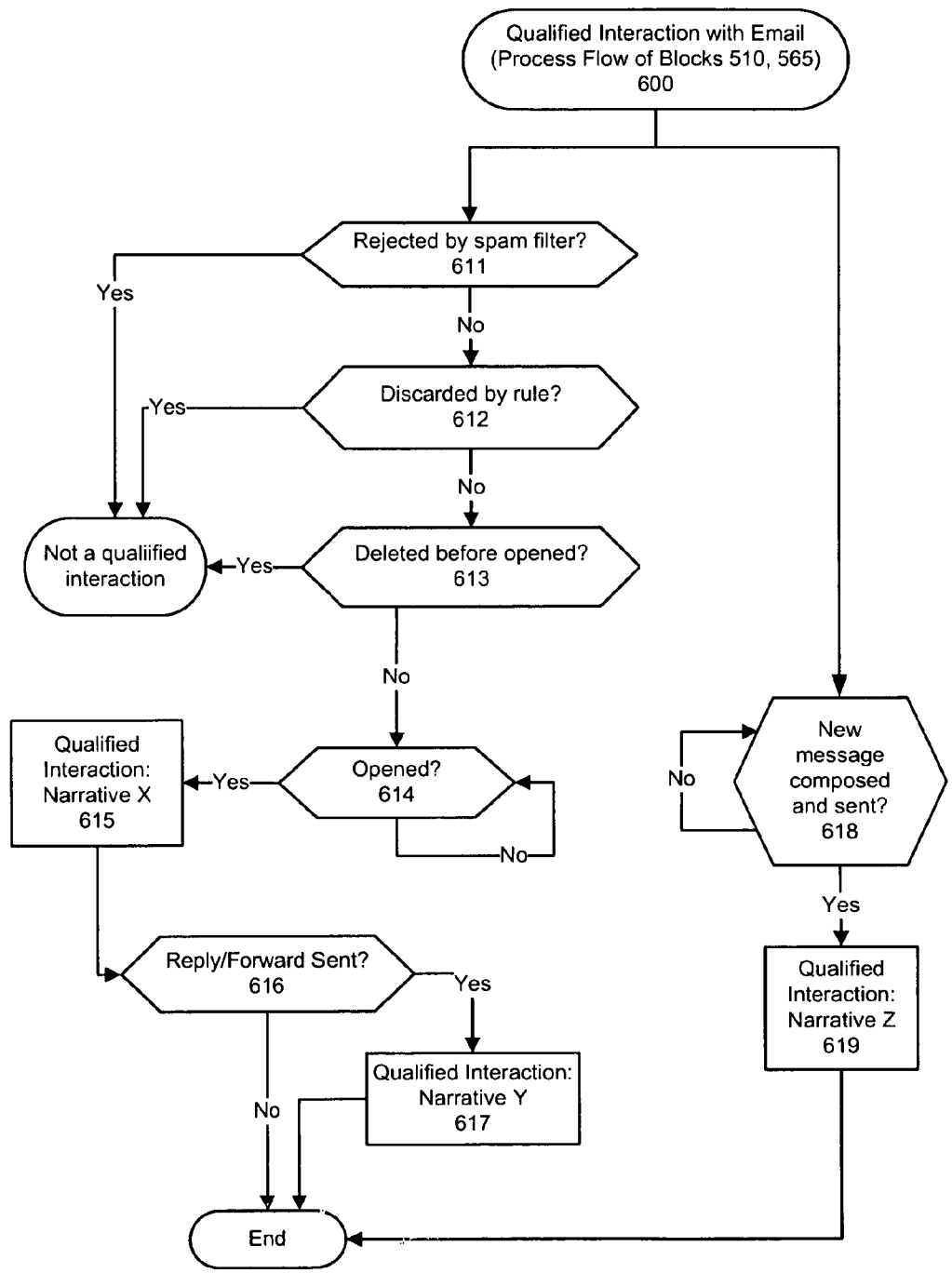
FIG. 6 is a flow diagram illustrating a sub-process performed by an event-handler that identifies whether an interaction with a particular email message qualifies to have a proposed time-record entry constructed and presented to the timekeeper.

Turning now to the process diagrams of FIGS. 5, 5A and 6, processes that result in action by the ATRE generator in response to interaction with email messages are described. When the event is a qualified interaction with an email, PTREs are generated and, once confirmed, comprise TREs 410, 420 in the time-entry program and accounting system. When the event is a telephone call (process 500B of FIG. 5B), PTREs are generated and, once confirmed, comprise TREs such as 430 in the time-entry program and accounting system.

A software process configured to automatically construct TREs in response to a qualified interaction with an email is described in connection with FIG. 5. The process 500 commences within an email application executing on a stand-alone machine or a machine attached to a computer network. For purposes of discussion, the email program is Microsoft Exchange executing on a server, but the email program can be any of a variety of commercially available email systems including, for example, Lotus Notes mail, and the software process 500 can execute in parts, with some parts being implemented on a server and the rest executing on a client machine. One embodiment of the invention has a portion of the process comprising an extension of Microsoft Outlook (or other email client software), preferably executing as a background process. An extension is presently required on the client-side of Microsoft Outlook because the rules wizard within currently supported versions of Microsoft Outlook as of this writing have no facility for passing parameters out of Outlook. In different environments, the software can be integrated into the email program or operate entirely through the email program's API.

As indicated at block 510, the process 500 monitors interactions with an email account in order to detect or identify user interactions with a particular email message that is indicative of an event for which a time record entry (TRE) should be constructed. As non-limiting examples, the interaction can comprise detecting emails that have just been opened, that have just been sent in reply to a previously received email, or that have been sent as a newly composed email. A set of prescribed interactions that are to be acted upon by software of the present invention is defined so as to include at least these types of interactions. The set of prescribed interactions can be a line item in the timekeeper configuration data or can be an administrator setting that governs all instantiations of the software process 500. The set of prescribed interactions that qualify as a basis for a billable event can be detected by the event-handler module 212 and handled by that module, alone or in conjunction with rules such as may be managed or assigned by the management module 280. On the other hand, the process 500 can ignore interactions such as deletions, or removals to a spam folder, or movements of email to a folder within the email program, or any processing performed according to a rule executing within that email program such as a reply that is sent as an automated out-of-office notification, a received notification, or a read-receipt. This too can be based on local settings by the timekeeper or global settings by an administrator. Until a prescribed interaction is detected, the software process 500 can loop as a background thread. Further details regarding interaction with emails are discussed below in connection with the process diagram of FIG. 6.

In one embodiment, emails that have had a prescribed interaction are processed at blocks 520 through 550 by the parser 200 and the heuristic engine 230. The parser extracts information from each email and the heuristic engine compares the extracted information with information in a database for the purpose of associating the email message with a billing reference, as previously described.

Referring briefly again to FIG. 1, a prescribed interaction can be through a desktop mail client 120 or a mobile mail client 130. As understood in the art of email message handling, actions at a mobile mail client are ordinarily replicated on the desktop mail client through a standard setting which synchronizes the status of messages on the desktop client and the mobile device to the status of the same messages on the mail server, and vice versa. In FIG. 1, the message 140 has had a prescribed interaction. For example, the message 140 could comprise an opened or sent email. More generally, the message 140 can be an electronic document or an electronic message having a different format than an email, such as an instant message or an SMS, but in order to describe a complete example of the process 500, time record entries are constructed based on interaction with emails. It should be apparent, however, that other electronic document and message types can trigger automated construction of time-record entries, if desired, in a particular embodiment of the invention.

At block 520, the message 140 is parsed by the parser 220 to extract terms through an API of the email program 210. Those terms are provided to the heuristic engine 230, preferably as syntactic structures that can be tested against the database 250 to assist in identifying, or to uniquely identify, the billing reference. The purpose of the heuristics engine is to make an intelligent assessment of syntactic structures or other information provided to it by the parser module. The parser 220 can execute externally of the email server program getting its data through an API, or it can execute as an extension to the email client. The heuristic engine 230 and ATRE generator 260 preferably are implemented independently of the email program.

At block 530, the heuristic engine 230-E receives information extracted by the parser 220 and processes that information with a goal to reduce the set of billing reference prospects to a single, unique billing reference. By comparing the entries in the database 250 to the data extracted by the parser, the set of billing reference prospects is reduced from the set of all billing references in the accounting system. More specifically, the database 250 includes terms from an accounting system database, and also can be organized so as to have its contents associated with particular time-keepers to facilitate processing the syntactic structures output by the parser. Typical terms in the accounting database are the full contact details of persons associated with a client and/or matter (name, postal address, email address, salutation) as well as narrative information entered by timekeepers and other personnel into the time entry application 160. In addition, database 250 (or a different user-specific log file) can include historical match information and "never bill" preferences, as discussed above. If the parser 220-E acted on the sample message 300 in FIG. 3, then parsing the header 310 of the message extracts syntactic structures that are useful to the heuristic engine 230-E in identifying the billing reference. The entire email address PSaunders@Freedom.com comprises a term that can be tested against the database 250 using the heuristic engine 230, and the domain "Freedom" comprises a separate term that can be passed by the parser into the heuristic engine. As well, if the properties of the sender are exposed, then the name Patrick Saunders might be extracted from the message by the parser 220. Other operations can be performed on the email address to manipulate the string and provide text for further analysis (e.g. "PSaunders" in the user name portion might be recognized by the heuristic engine as Patrick Saunders based on the concluding note "Best Regards, Patrick"). In addition, the header 310 includes a subject line ("Status of the Gizmo?") and those terms can be used in furtherance of the processes of identifying a particular billing reference. The body of the message also includes text that can be used by the heuristic engine, particularly any uncommon words such as the term "Gizmo" that appears in message 300. In addition, the message 300 may have embedded information or information that normally is not displayed to a user which encodes or includes the billing reference information in the clear or as a hash value that can be used to retrieve the billing reference.

Thus, using the extracted syntactic structures the heuristic engine 230-E operates to reduce the set of billing reference prospects to a single, unique billing reference at block 530. At block 540, a test is made to determine if the heuristic engine has been able to locate a single matching billing reference. If more than one billing reference remains after running the engine, or if no candidates were revealed at all, then at block 550, the user is prompted through a user interface 270 to assist in identifying a correct billing reference. The prompt can comprise a presentation on a display screen that includes the reduced set or a null set of billing reference prospects (see billing prospects 920 in FIG. 9). The display can further provide the user with a browse function to search through the database of accounts so as to locate the correct billing reference from the billing references known to the accounting system.

On the other hand, if only one matching billing reference emerges from the heuristic engine 230—which is more and more likely to be the case once the process 500 has previously constructed a time record for that same matching reference, then the process flow proceeds to block 560 for construction of a time record using the ATRE generator 260. The time-record entry is constructed by combining information extracted by the parser and processed by the heuristics engine, including at least billing reference information and information related to the email, such as, without limitation, information that was included within the header of the email, the body of the email, or both. The PTRE is presented to the user, as indicated at block 570, alone or together with other time records that have been automatically constructed, for approval, modification, or dismissal.

Figures 3, 4:
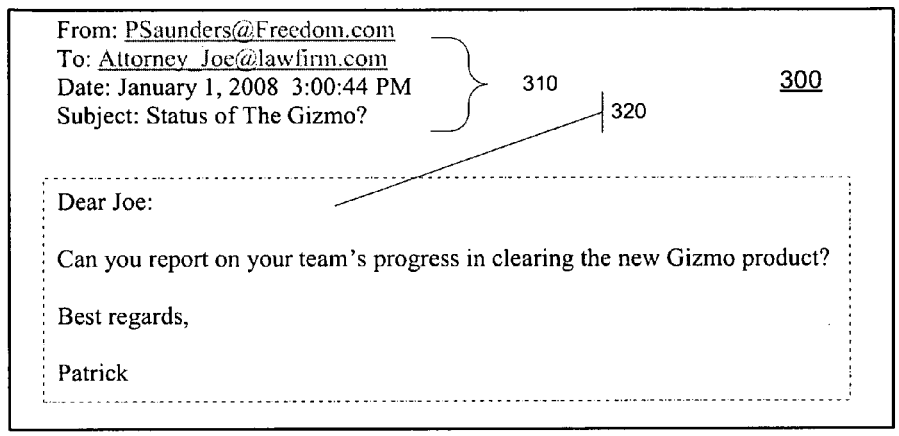
FIG. 3 is a conceptual illustration of an email message.
FIG. 4 is a conceptual illustration of time-record entries within a time-entry application or an accounting system.

The user interface includes editing functionality so that a user can review, modify, and approve or dismiss any particular entries, as indicated at block 580. If any of the records have been approved, with or without modification, an instruction is received through the user interface which causes the accepted or modified records to be output, such as for inclusion in the time entry program, as indicated at block 590 and as shown in FIG. 4. The acceptance or modification of a time record could be a result of the timekeeper having confirmed its correctness from within the time entry program 160 or by transferring it (e.g., importing the record) into the time entry program.

Optionally, the management module 280 automatically causes the email and any attachments to be stored within the public document management system 150 of the enterprise, so that the email and any attachments are available to other network users. Storage is made in accordance with the billing reference associated with any accepted or modified TRE, as indicated at block 595 shown in broken lines since this further process is optional. In other words, if the accepted TRE identifies the client as "Freedom" and the matter as "The Gizmo," as in TRE 410 of FIG. 4, then the email can be saved at a path having the structure H://Freedom/The_Gizmo/doc_id_123.eml, where H is the directory for public documents and doc_id_123.eml is a file name that can also be constructed to be more user-friendly, such as by using text from the subject line of the email. In this way, company records are better preserved than if the task of moving each email having sufficient significance so as to warrant a professional time charge is left to the individual timekeeper or an assistant having access to that timekeeper's account.

In the foregoing discussion, an email with a prescribed interaction is associated with a billing reference after interaction has been detected by the event-handler module, and the ATRE generator only operates on emails that have had the prescribed interaction. As such, only the particular email within the email account that has had a prescribed interaction will be presented through the user interface as a proposed TRE while none of the non-interacted emails will appear as proposed TREs. However, the association process can be made or commenced as part of the background process to the extent that resources permit. FIG. 5A illustrates an alternative process flow 500A which performs anticipatory processing on incoming emails (such as those emails that are subject to processing beyond blocks 611 and 612 of FIG. 6) to hasten the association with a billing reference, should the email, in fact, be one having a prescribed interaction. The operative blocks in FIG. 5A are generally the same as in FIG. 5, and are not described in detail. Briefly, the process starts by parsing at block 520 email items that are received at an email account of the user, regardless of whether the event-handler has detected that the user has interacted with the email. Block 520 also acts on any email sent from the email account of the user. The heuristic engine 230 matches the syntactic structures provided by the parser and sends its output to the ATRE generator 260, as indicated at block 530. As described above, this may result in a uniquely identified billing reference or in a reduced set of billing reference prospects. The ATRE generator constructs a proposed TRE at block 560. This process is performed for a set of email messages within the email account and causes a billing reference association to be made and a TRE to be automatically constructed even though the timekeeper has not performed a prescribed interaction which identifies a particular one of the emails as a potential billable event. However, at this stage, the user is not informed that proposed time-record entries have been constructed nor is the user prompted to uniquely identify the billing reference if the heuristic engine could not complete that task. Rather, only after a qualified interaction has been detected, as indicated at block 565 (which can operate substantially the same way as block 510 of FIG. 5), can a proposed TRE be presented to the user, as indicated at block 570. Thus, the process 500A has performed much of the required analysis and work as a background process and is ready to present a proposed TRE as soon as the timekeeper opens or sends an email. Thus, a user interface appears to solicit whether the timekeeper wishes to accept, modify or dismiss the proposed TRE as soon as the event occurs. The process 500A concludes with a test at block 580 for any instructions being received to accept or modify the proposed TRE(s) and with the outputting of any accepted/modified TREs at block 590, as previously described. Optionally, the email and any attachments can be stored on the PDS 150 using the determined billing reference as the path for file storage so that other persons within the enterprise have access to the document, as indicated at block 595.

Referring now to FIG. 6, a process flow illustrates the actions taken in connection with determining whether a qualified interaction has occurred with an email. Depending on the nature and number of qualified actions in a given day, the ATRE generator 260 will construct time-records in different ways, such as to produce the various narratives shown in FIGS. 4 and 8. FIG. 6 depicts a process as a series of steps for purposes of discussion but in a practical implementation is presently contemplated as being an event-triggered set of actions taken on software objects, and, as such, the events shown as being tested at blocks 611-614, 616 and 618 could be detected by an event-handler routine in any order. For ease of discussion, however, the events are considered serially.

Generally, automated events are deemed as unqualified interactions whereas manual events are deemed as qualified interactions that give rise to a potentially billable event, to be affirmed in the timekeeper's sole discretion. Starting at block 611, a test is made to determine whether a reported interaction with an email is a result of an email being rejected by a spam filter or being quarantined due to a virus. If this test is satisfied, then the action is not deemed as qualifying as the basis for a time-record entry because no effort is made by the user in connection with that action. The process 600 for that interaction can end at this point. As noted above, automated interactions such as this can be detected as an event rather than being discovered as a result of a "test," and the same is true for the rest of the decision blocks in the process flow diagrams accompanying this Specification.

If the test at block 611 fails, then further tests are performed. At block 612, a test is made to see if the interaction was a result of a rule that discards an email or otherwise interacts with the email in an automated manner that does not require any user effort. An automated rule that discards or otherwise constitutes an unqualified interaction could take a variety of forms, including without limitation an out-of-office assistant that automatically responds to an incoming email, an automatic filing to a public group folder, an acknowledgement receipt if that was requested by the sender and permitted by the recipient's settings, or a read receipt. If the interaction is a result of an automated rule, then the interaction is regarded as not a qualifying interaction, and the process can again end at this point. Otherwise, the email can be tested at block 613 to test whether the interaction was an email deletion by the user without ever opening the email. Such deletions are not qualifying events so if the test at block 613 determines that the interaction was a deletion without ever opening the email, then the event is not a qualified interaction and the process can end at this point.

If any of the tests or detected events at blocks 611 through 613 results in a determination that the interaction is not a qualified interaction, then a proposed TRE should not be presented to the timekeeper. Thus, in the process of FIG. 5, the process loops after the test at block 510 to test the interaction with a next email message and no further processing is done on that email. In the process of FIG. 5A, anticipatory processing at blocks 520, 530 and 560 are performed, but process 500A bypasses the presentation block 570 so that the timekeeper is not presented with a PTRE to select based on that email.

Assuming that all pertinent tests concerning automated interaction with an email have been performed, such as the tests at blocks 611 through 613, the process flow 600 for any particular email awaits a report from the event-handler module 212 that a particular email has been opened, as tested at block 614. Meanwhile process steps 611-613 operate in parallel on each email interaction associated with a particular user. As such, the process 600 can assign a state to, or monitor an existing state of, each identifiable email (e.g., in view of its Message-ID), or more preferably assign/monitor a state ("not opened," "opened," "reply" or "forward," "composed") for those emails that satisfy the prescribed criterion tests at blocks 614, 616, or 618, namely, the manual interaction tests discussed next. The state information can constitute a flag maintained by the management module 280, discussed further below.

On the other hand, once the email has been opened (also tested at block 614), that event can be viewed as a qualified event that will prompt the ATRE generator 260 to generate a PTRE (process flow 500) or present the proposed TRE (process flow 500A), subject to further rules such as "never bill," as may be stored in a table within the database 250. At block 615, the qualified interaction is assigned a narrative X by the heuristics engine 230, such as "review and consider email from _____." For example, the heuristics engine can provide the ATRE generator 260 with the narrative text or a flag that identifies which text to select from the database 250. This flag can be a state flag (e.g., "opened"), as noted above. The remaining portion of the narrative is completed using information extracted by the parser 220 and the output of the heuristic engine 230. The process does not necessarily end at this point, however, for qualified emails.

Optionally, tests can be made to determine whether there have been any further prescribed interactions with the particular email that was tested positively as having been opened. For instance, a second prescribed interaction could be that a reply has been sent or that the opened email has been forwarded, as indicated at block 616. These tests can comprise interrogations or message exchanges between the event-handler 212 and the email server to synchronize the event-handler's action log to the current status of the emails in the timekeeper's email account. If there has been a further prescribed event, then the narrative for the qualified interaction can be altered to Y, such as shown in FIG. 8. TRE 810: "Exchange emails with _____ [re: _____]"). For instance, the state can be advanced from X ("opened") to Y ("reply" or "forward"). The heuristics engine 230 can recognize or be informed that the further interaction is a reply or a forward of a particular message for which a PTRE has already been constructed and included in a table of proposed TREs, so long as it has not been approved by the user and cleared from the user interface of the widget 900 into an output table or file. The heuristics engine can then provide the ATRE generator 260 with replacement text for the narrative that the ATRE generator can include in place of the narrative text of the so-identified previous table entry, or it can provide the ATRE generator with a flag (e.g., a state flag) that identifies that the previous table entry has to use different narrative text from a suitable table in the database 250. The ATRE generator can assess the state of a particular interaction and replace or modify the narrative, and optionally increment the hours worked, using that state assessment rather than obtaining the instruction from the heuristics engine. In either case, the remaining portion(s) of the narrative is (are) completed using information extracted by the parser 220 and the output of the heuristic engine 230. As such, the assessment causes a replacement or a modification of the narrative that is distinct from a mere concatenation of existing or proposed time records; instead, the resulting narrative more concisely and intelligibly describes the chain of prescribed interactions in, say, a chain of emails that has been exchanged with a particular person. The process ends at this point.

Likewise, if there is a second telephone call that concerns a call to or from the same telephone number as a previous PTRE, that second event can be distinguished from the first call, for instance, on the basis of the date or time or duration of the call—all information included in the call—log, and the narrative can be revised accordingly. For instance, the narrative can be revised from "Telephone conference with D. Tracy" to "Separate telephone conferences with D. Tracy." If the subsequent calls are comparatively short or comparatively short and not more than a few minutes in length, the heuristic engine can maintain the state so that the narrative is not revised. Likewise, if there is a service disruption that results in a mobile call being dropped followed by a second telephone call, the PTRE can be combined into a single proposed TRE rather than having to be accepted after each call drop. In this regard, the abrupt call termination without handshaking can be the heuristic basis (rule) to combine PTREs without altering the narrative, or a series of calls without intervening calls can be the heuristic basis to combine PTREs without altering the narrative.

The foregoing process steps have concerned a process flow taken with respect to, or in response to, incoming emails. When a new message is composed and then sent, a different process flow is taken, as indicated by the test at block 618. At block 618, a test is made to determine whether a message has been composed and sent. If no such event has occurred, then parallel process steps as discussed above are performed on each email interaction associated with a particular user's email account. This is indicated by the arrow looping back to the decision block. On the other hand, if the process detects that an email has been composed and sent, then the message is deemed a qualified interaction because the user has put effort into that event. The heuristics engine assigns a state or a narrative and communicates that determination to the ATRE generator in the same way as described above. For example, a narrative Z can be identified to the ATRE generator 260 (e.g., "Compose and send email to _____ [re: _____]"), with the remaining portion(s) of the narrative being completed using information extracted by the parser 220 and the output of the heuristic engine 230, as indicated at block 619. The state of the interaction ("sent") can be assessed by the ATRE generator rather than obtaining the instruction from the heuristics engine.

FIG. 7 illustrates a reply email composed and sent by Attorney_Joe in response to the email 300 of FIG. 3. The reply email can be convention in all respects, yet the parser 220 operates to extract syntactic structures that are used by the heuristic engine 230-E to identify this email as a reply to the email 300, such as any state information obtained by the event-handler 212. FIG. 8 illustrates a TRE 810 that has been automatically constructed by the ATRE generator 260. The TRE itself, as shown within the time entry application 160 or accounting system 180, is conventional. A second time entry 820 concerns an email that is composed and sent by Attorney_Joe, except that it is a new message that is not recognized or identified as continuing a prior email message thread. The ATRE generator 260 constructs this TRE as described above.

Referring now to FIG. 5B, a software process 500B operates to automatically construct PTREs in response to the receipt or creation of a telephone call. The process loops at block 510B until call activity is detected. The call activity can comprise receiving a call at a telephone deskset or a mobile device having a device ID that is registered with the computer network (e.g., a Blackberry® phone issued to the timekeeper by the enterprise). The call activity can also comprise a call initiated by the timekeeper from either of these types of devices. Telephony equipment 100 is communicatively coupled to the machine running the software process 500B through a TAPI connection and can comprise a PBX, a mobile communication device server such as the Blackberry® Enterprise Server, or other equipment, alone or in combination with the foregoing. Mobile devices can have a network connection such as through a WAP interface to a machine executing the process 500B, in which an application executing on the mobile device makes call-log information available to the parser 220-TM, as described above. That application can be loaded on and execute from the mobile device, or the call-log information can be pulled or pushed from a TSP, but in either case provide a surrogate for a TAPI connection.

The TAPI connection (or surrogate) provides call information to the software process 500B either in a real-time or batch mode. At block 520B, the parser 220-T, TM monitors the TAPI connection and responds to any detected call activity by extracting the call information. The call information can include, without limitation, caller ID information, DDI information, MAC/Device ID of the telephone deskset or mobile smart-phone, the time a call commenced, and its ending time or duration since the start time. The parser 220-T, TM arranges the call information in a predictable way for use by the heuristic engine 230-T.

At block 530B, selected call information is applied to the heuristics engine 230-T which seeks to reduce the set of billing reference prospects to a single, unique billing reference. If the parser is able to extract an ANI/CLI in the case of a received call or the DDI (MSN/DNIS) in the case of an outgoing call, then that identifying information can be matched against telephone contact information from the accounting system or against prior matches that have been confirmed by the timekeeper as may be stored in the database 250 in the timekeeper's configuration data or elsewhere. The extracted information can provide the name of the person or company calling-in or being called, and that data can be at least partially matched to the billing reference information. If several possible matching billing references exist, as tested at block 540, the timekeeper will be prompted to resolve the matter, as indicated at block 550, and that prompt can be done concurrently with the presentation of any automatically constructed PTREs. Otherwise, if there is only one matching billing reference, also as tested at block 540, then the ATRE generator 260 constructs a PTRE by combining the billing information, as determined or partially determined by the heuristics engine, with other call information. Blocks 540 and 550 are substantially as described above in connection with FIG. 5.

The heuristics engine also can provide call the ATRE generator with duration information to the ATRE generator 260. The parser 220-T receives at least the start time of a call. The TAPI connection informs the process 500B when the call has terminated. Call duration can be provided directly across certain TAPI connections, or that information can be computed using call start and call termination information.

The ATRE generator can obtain the timekeeper identity and the date of the telephone call from the information provided by the TAPI connection or from other resources. The heuristics engine receives the MAC or device ID of the particular telephone deskset or a mobile device on which the call was detected, and this can be mapped to the timekeeper identity which is then provided up the stack to the ATRE generator. The date, if not provided over the TAPI connection, should be available from the time clock of the machine executing the process 500B to include in the PTRE.

The presentation of automatically constructed time records and the user interface for accepting, modifying, or dismissing them, as indicated at blocks 570 through 590 is substantially as described above in connection with FIG. 5.

Figure 9:
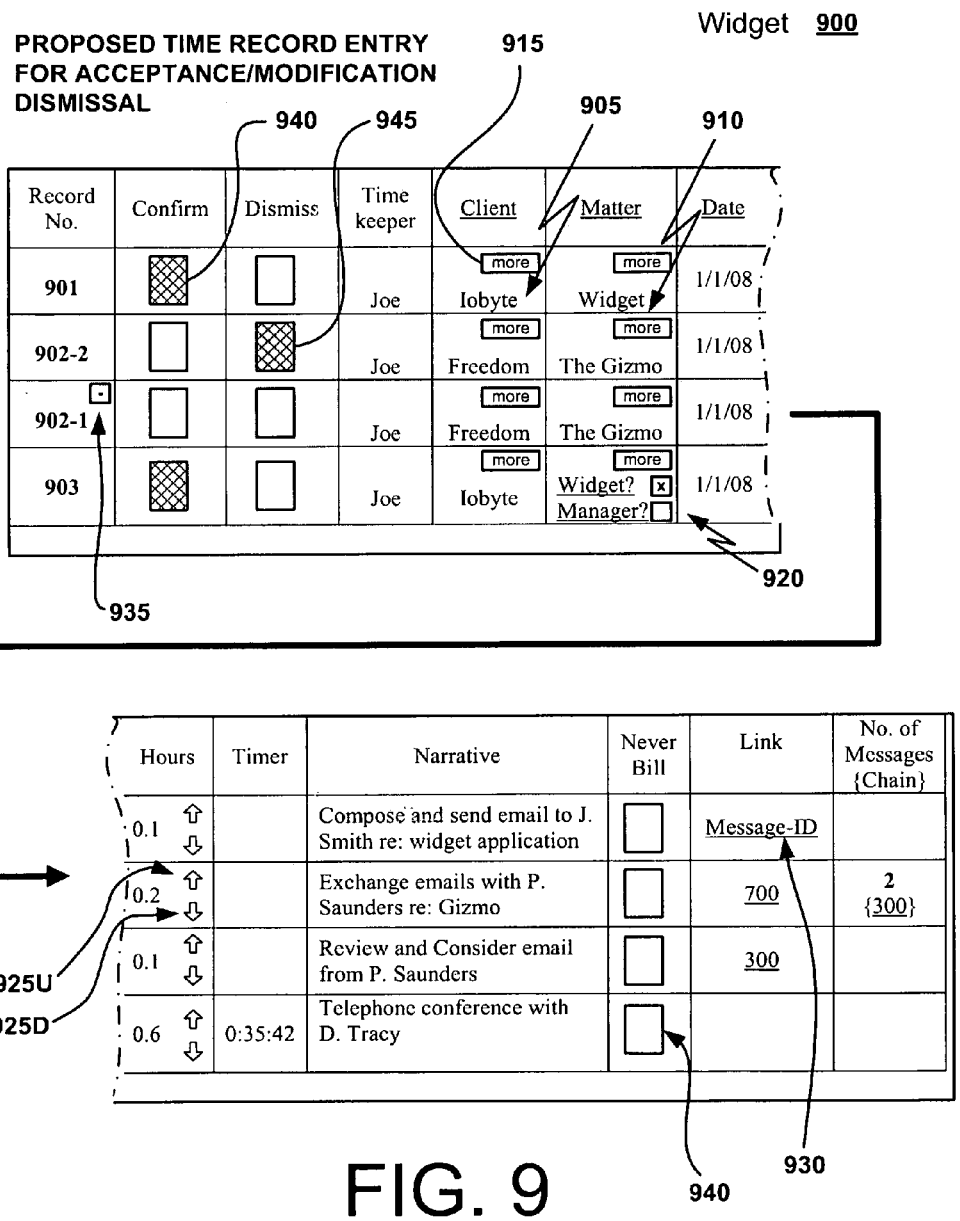
FIG. 9 is a conceptual illustration of a software widget that includes an interactive presentation to the timekeeper of proposed time-record entries.

Turning now to FIG. 9, the user interface (UI) 270 that presents proposed time-record entries to the timekeeper can comprise a widget that executes on a client machine. In one embodiment, the widget 900 comprises a program that remains active on the desktop of a client machine, such as a program running in the taskbar or sidebar in a Windows environment or on the desktop itself. In another embodiment, the widget can be web-based and accessible to the client through a conventional browser connection. Yet another embodiment is a stand-alone application that can be selectively launched by the timekeeper. In addition, versions can be provided for use on mobile devices.

The widget 900 interactively presents the proposed time-record entries generated by the ATRE generator to the timekeeper and receives instructions from the timekeeper concerning whether any particular entry is to be accepted, dismissed, modified, or otherwise handled. In FIG. 9, the proposed TREs are presented in a table, though that is not required. The table provides a convenient arrangement of data fields in columns and proposed TREs in each of its rows. It is desirable to display several columns simultaneously, though a given timekeeper may wish to change the presentation so as to only display certain fields, which preference can be stored among the timekeeper configuration data. For instance, while certain fields must be displayed to ensure that the proposed record is understandable and for required interaction (e.g., confirm, dismiss, client, matter, hours, narrative), other fields need not be displayed (e.g., record number, timekeeper, date, timer, never bill, link, number of Messages/{Chain}).

The rows include the data that has been automatically provided into respective proposed TREs 901, 902, 903, . . . in response to the trigger events described above. Preferably, controls permit the proposed TREs to be sorted by billing reference or date, and, once sorted, a control can permit selected records to be combined if the timekeeper so instructs. Upon combining two proposed TREs, the hours in each record can be summed for the combined record, though the narrative may require further user action to complete.

Row 901 is an automatically constructed PTRE based on an email that the timekeeper sent to J. Smith regarding a widget application. This entry is a result of the software process 500, 500A parsing the email that was sent, extracting syntactic data from the email, and processing that data so as to construct the record entry 901. The billing reference information (client field 905 and matter field 910 in this figure) is uniquely identified, yet the timekeeper can interact with a "more" control 915 which preferably comprises a button object to call up a list of valid clients or matters if a different billing reference is to be used. In row 903, by contrast, the matter was not uniquely resolved but the selections were narrowed to several prospects 920, namely "Widget" and "Manager." The timekeeper can select either prospect, which can be presented as selectable links, or the timekeeper can interact with the "more" control 915, as previously described.

The hours field is populated, by default, with the value in the timekeeper configuration data (0.1); however, controls 925U, 925D enable the user to increment and decrement (i.e., change) the amount of time to better reflect the true amount of time spent on that activity. Alternatively or in addition, the timekeeper can be permitted to type a new value into that column.

If the timekeeper wishes to review the source document for the time entry, that can be simplified in accordance with a further aspect of the invention. In particular, the conventional course of events has the timekeeper initiating the time-recording process and so the timekeeper is aware of the event that prompted the PTRE at the time of creating the PTRE. However, the automatic PTRE construction of the present invention can result in a time gap between record construction and record approval. As such, the widget 900 can provide tools assist the timekeeper if he or she wishes to review the source document(s) that gave rise to the time entry. One tool comprises a link 930 provided in the proposed TRE that provides access to the underlying message that gave rise to the proposed TRE. Because the contents of the email or other message have been parsed by the parser 220-E, that information is available for display, if desired. For example, it can appear within the narrative text toolbar 1000, described below. Alternatively, the link can comprise a message-ID of the particular email or other document with which the timekeeper interacted. The message-ID can be passed to a viewing program and used to retrieve (e.g., search for and display) that particular message. In row 902-2, for example, the email that gave rise to the proposed TRE includes email 700 of FIG. 7, and that can be recalled within the email program if the timekeeper wishes to review the source document for the time entry. In addition, the proposed TRE of row 902-2 can include a chain of prior messages such as initial message 300 of which message 700 is a reply. The depth of the chain, i.e., number of messages that preceded the current message, can also be indicated in the widget 900.

The narrative field preferably is a text box that can be edited by the user. In one implementation, the cursor can be brought to this field by default. The narrative that populates the field is constructed or modified in accordance with the state flags discussed above. As such, the narrative for a first communication as in row entry 902-1 results from interaction with email 300 of FIG. 3. However, once the timekeeper has replied to that email with message 700 of FIG. 7, the narrative is modified, as shown in row entry 902-2. Row entry 902-2 supersedes row entry 901-1 and so only one of those rows can constitute a valid PTRE to be released. While both rows are shown, superseded entries can be shown shaded, dimmed, or can be hidden behind an expand/collapse control 935.

In the event that the timekeeper does not wish particular events to result in proposed TREs, he or she can provide a "never bill" instruction using the control 940. The never bill instruction establishes that the PTRE is to be dismissed for the proposed TRE and that any future event based on communications with that person are not to be billed. For instance, the timekeeper can set the "never bill" flag and the ATRE generator 260 will then limit future proposed TREs to those that do not have the never bill flag set. Thus, for example, the "never bill" flag can be set as the default event handler for emails from a spouse, friend, a subscribed-to list service or a particular vendor, or from an internal address within the domain (i.e., with a secretary or company personnel) and none of those emails will result in a proposed TRE once the timekeeper enters that preference, or the never bill rule can be assigned to a particular client (e.g., never bill internal communications, as in Freedom:MSG_Type=Internal to not bill client Freedom for internal message exchanges). The configuration data 252 can store timekeeper preferences such as this one to influence data presentation through the UI widget. As a result, with continued use of the widget, extraneous communications can be actively filtered so as to limit proposed TREs to work-related communications that are potentially billable.

If the timekeeper is ready to accept the PTRE as an actual time-record entry that will result in an invoice directed to the billing reference in the PTRE, he or she can instruct the widget to accept the record, including any modifications that the timekeeper has made, using the confirm control 940. The modifications can include changes to the narrative or to the amount of time to be charged. In FIG. 9, records PTRE 901 and PTRE 903 have been confirmed and will be included in an output table or file for posting as a time-record entry approved by the timekeeper directly to an accounting system 180 or to an intermediate system such as a time entry application 160.

On the other hand, the timekeeper has the discretion to dismiss a proposed TRE as concerning an event which he or she does not consider appropriate to bill. Control 945 is used input the timekeeper's instruction to dismiss any particular PTREs. In FIG. 9, record PTRE 902-2 (as well as its predecessor PTRE 902-1) have been rejected because the timekeeper, in his or her sole discretion, decided not to recognize those emails as a basis for a billable event.

Optionally, the widget 900 can keep a record of how many times in a day, week or month, or trailing X-number of days has a PTRE for a uniquely identified billing reference been dismissed so that the timekeeper can be notified of this data and take it into consideration the next time a PTRE for that billing reference is generated. In this way, if emails to a particular client have been previously dismissed, say, nine times in the past week as not being a basis for a TRE, a notification can be provided to the timekeeper who may treat the issue differently upon the tenth event of this type. The threshold for this setting can be part of the timekeeper's configuration data or set by an administrator. Apart from this information, once a PTRE is confirmed or dismissed, the widget can clear its data and any tables so that the only information preserved is the information that is included in the output file or table of accepted TREs. In other words, any links, initial time proposals or narratives, timer data for a telephone call, and modifications can be discarded upon generating the output file or table.

With reference now to FIGS. 9A and 10A, a toolbar is illustrated which can assist the timekeeper in modifying proposed TREs. The narrative toolbar 1000 can provide a selection of previously accepted time record narratives or narrative-field portions 1010, 1020. The narrative toolbar can also show the header or message portions 1030 parsed by the parser 220-E for the particular event (e.g., email) that is the basis for that proposed TRE. This information can be copied and pasted or click-selected, if desired, to amend the narrative language. For instance, the timekeeper can customize the narrative for record 902-2 to make it more action-specific by adding the "re: Gizmo" text that was added to a previous email by selecting toolbox item 1010, which augments the entry to include that text in cell 950. The header and message portions 1030 can also assist in reviewing the correctness of the proposed TRE, as discussed above.

With reference now to FIGS. 9A and 10B, another toolbar is illustrated which is adapted to provide a selection of flat fee codes that can be used in lieu of actual or default hour entries I the hours column 955. Flat-fee codes can be more appropriate than time entries for repetitive tasks or certain specified tasks. The time entry in the "hours" column is typically multiplied by the timekeeper's hourly rate, and may be adjusted in view of any applicable client- or matter-level discount. The flat fee code, if included in the time record entry, overrides the value of the time of the time entry and causes the accounting system 180 to charge an amount associated with the flat fee code instead. For example, a code 5540 replaces the default time entry in cell 960 and can be typed into the hours column, causing a narrative associated with that code to populate and replace any previously constructed narrative in the narrative field. As shown in FIG. 10B, the widget can include a toolbar 1050 that includes selectable codes 1060, . . . , 1085, etc. that can be included in any of the proposed TREs. The timekeeper's configuration data 252 may keep track of the flat-fee codes used by that timekeeper so that the toolbar 1050 tailors itself automatically to include that timekeeper's most frequent requirements, most recent requirements, or both. The toolbar presents flat fee codes for selection, and the timekeeper can make the selection in a variety of ways through the UI, such as by dragging the code to a record or clicking on one of the codes while the record is active. The toolbar 1050 can be closed to remove it from view, if desired.

Figure 11:
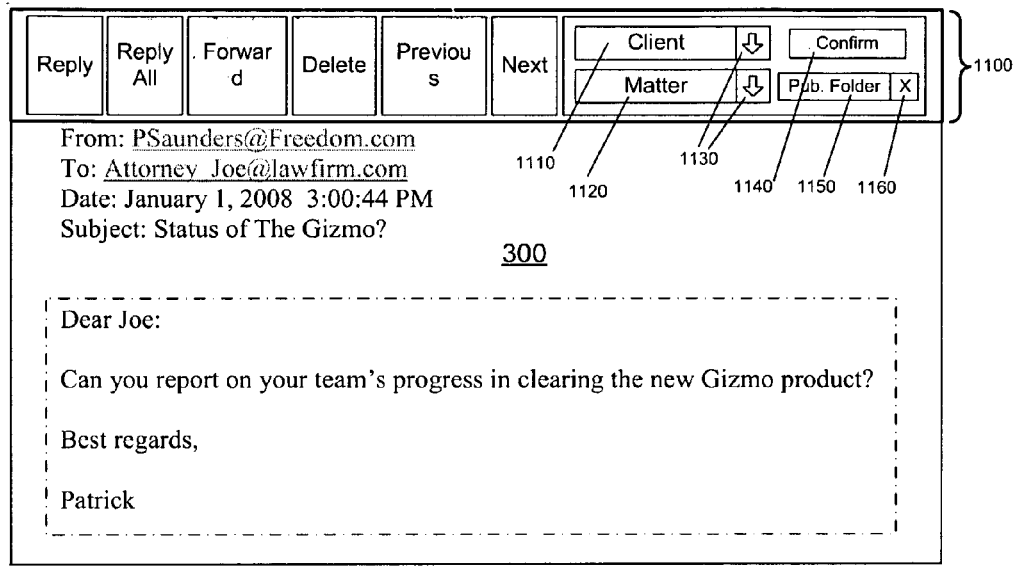
FIG. 11 is a conceptual illustration of the email message of FIG. 3 shown in conjunction with an email message toolbar.
Figure 12:
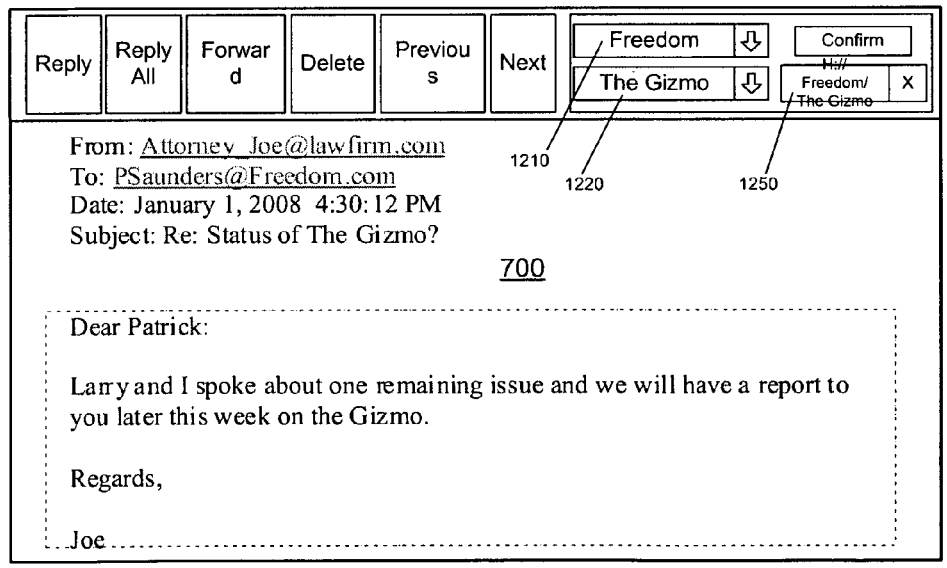
FIG. 12 is a conceptual illustration of the email message of FIG. 7 shown in conjunction with an email message toolbar and further showing information deduced by the method and system of the present invention.

Referring now to FIGS. 11 and 12, email messages 300 and 700 are shown, respectively, in conjunction with an email message toolbar 1100. The toolbar has a set of conventional controls which are provided within an email client application. In some client applications such as mobile mail applications, the controls are provided within a pull-down menu. As a departure from the conventional set of controls provided in a client email application, the toolbar includes additional controls that allow the user to identify the billable reference, such as the client and matter information that can be included in a PTRE as described above. The client and matter fields are preferably selection lists that are informed with choices by operation of the heuristics engine 230-E. Operation of the heuristics engine might uniquely identify the client and matter fields without user intervention, as shown in fields 1210 and 1220 for the reply email. Alternatively, the selection lists can be dynamically constructed based on operation of the heuristics engine 230-E to provide the timekeeper with a set of billing reference prospects as well as a "more" selection in case the reduced set is a null set or otherwise fails to identify the correct matter, in the timekeeper's view. The pull-down arrow 1130 allows the selection lists to be exposed.

The toolbar 1100 can assist in PTRE construction by providing a prompt to the timekeeper if the heuristics engine has not uniquely identified the billing reference (see block 550 of FIGS. 5 and 5B). The timekeeper may confirm the billing reference information using the confirm button 1140, or the confirmation can await presentation of the PTRE within the widget 900.

Optionally, the timekeeper can designate that the email and any attachments is to be saved to the public document system 150, by checking box 1160 (shown checked).

The location for storage on the PDS 150 is identified in the text box 1150 once the billing reference is known. In FIG. 12, for example, once the billing reference has been specified in boxes 1210 and 1220, then the path is fully defined, as shown in box 1250.

EXAMPLE 1

An email message 300 (FIG. 3) is received by Attorney_Joe. The email is opened by the timekeeper Attorney_Joe who puts professional effort into reviewing and considering its contents. Either as a result of interaction with the email (opening it) or in anticipation that the email will be reviewed, the heuristic engine 230 operates to uniquely identify a client 905 and a matter 910 that comprise the billing reference information in this example, provides that information to the ATRE generator 260 which proposes a TRE within the widget 900 (FIG. 9), including default values in the hours-worked field and a narrative constructed by the ATRE generator 260 with regard to the nature of the interaction with the message and the message itself. Thus, the proposed TRE can identify that the email was opened and read by Attorney_Joe. This is the result shown in time-record entry 410 of FIG. 4.

EXAMPLE 2

As in Example 1 above, except now the email message 300 includes attachments that were accessed by the timekeeper. In this case, the ATRE generator 260 constructs a TRE in which the narrative further describes that the email and the attachment was opened and read by Attorney_Joe. This is the result shown in time-record entry 420 of FIG. 4.

If several attachments were included and opened, the heuristic engine can inform the ATRE generator accordingly so that the narrative is correspondingly modified.

EXAMPLE 3

As in Example 1 above, except now Attorney_Joe replies to the email message 300 with the email message 700 of FIG. 7. The email 700 is parsed and the heuristic engine determines it is a reply to a prior email. The status flag is set to reply and the narrative selected by the ATRE generator is selected to correspond to the status setting. In this example, the ATRE generator uses the hours increment default value in the timekeeper's configuration data (0.1) to add to the value in the hours field of the proposed time-record. The resulting time-record entry 810 replaces TRE 410. TRE 410 now appears dimmed or otherwise distinguished in the widget 900 (see record 902-1).

If the proposed TRE 410 had already been released to a separate time-entry program or an accounting program, as can be discerned by comparing the proposed record to prior records in the chain, then the widget can suppress the automated hours increment because time has been captured already for the underlying event before the email 700 was composed and sent. This can occur, for example, if the proposed records in a chain of correspondence are reviewed and approved during different sessions using the widget.

EXAMPLE 4

Attorney_Joe receives a call from D. Tracy on his deskset telephone. Activity at the deskset telephone is reported through the TAPI connection and provides caller information that is parsed and processed as described in connection with process 500B to construct TRE 430. The call information provided to the heuristics engine identifies the client but may not be sufficient to uniquely resolve the matter 910. The widget presents the timekeeper with a unique billing reference or a reduced set of possibilities so that a unique billing reference can be identified using control 920. The ATRE generator receives from the parser 220-T and the heuristics engine 230-T call duration information which is used to populate the hours column. In addition, the raw data concerning the time of the call is shown in the timer field. The narrative is constructed on the basis of the heuristics engine's analysis of DDI information from the TAPI connection. Changes to the narrative in the proposed TRE can be made in order to make it more descriptive.

EXAMPLE 5

Attorney_Joe initiates and conducts a conference call with D. Tracy to find out the status of an investigation for client Iobyte. The call takes place from Attorney_Joe's cellular telephone. Activity at the cellular telephone can be reported as call information in several ways. First, it can be reported through a network connection upon connecting the phone to Attorney_Joe's computer so that the phone can synchronize messages between the two machines by sending a call-log directly to the parser 220-TM, as described above except without the need for an intervening email or SMS. Second, it can be reported wirelessly as a message communicated from the cellular phone to a server on the network, such as using an SMS or email message transmitted by the cellular phone to an email server, as described above. The call information is parsed and processed as described in connection with process 500B to construct TRE 430, substantially as described in Example 4 except using ANI/CLI information from the TAPI connection.

Several of the features of one embodiment or arrangement described herein can be used in other embodiments or arrangements to equal advantage and the foregoing specification should be read with that understanding.

While the present invention has been described with respect to a certain embodiments thereof, it is not so limited. The detailed description is presented to enable one of skill in the art to practice the invention and to disclose the best mode known to the inventor as of the date of filing this patent application. The invention more broadly encompasses systems and methods defined by the recitations in the claims appended hereto and the equivalents of such recitations, and is not restricted to the description of any particular embodiment or alternative arrangement described herein.

GLOSSARY

Automatic number identification (ANI): Information that comes in at the beginning of each call, usually with in-band Multifrequency Digits (MF) or digitally on an Integrated Services Digital Network (ISDN) D channel. ANI provides terminating CT equipment with the calling party's phone number, so that you immediately know the caller's identity. Caller Line Identification (CLI) is the caller's number that is to be displayed on the called party's handset. If the caller blocks the CLI, a call may not pass through certain Internet service providers.

Dialed Number Identification Service (DNIS) is a feature that sends the dialed phone number to the terminating CT equipment.

Mobile Service Number (MSN) is a feature that allows multiple numbers to be assigned to a single line so that different terminals can be selected to answer the call, like a fax machine, database server or telephone.

Direct dial-in (DDI) is a PBX function that allows dialing a person within the enterprise directly without having to go through a switchboard. DDI numbers operate over a variety of ISDN2 and ISDN30 circuits and so phone numbers are not tied to individual telephone lines.

We claim:
1. A system for automated construction of a proposed time record entry (PTRE) in response to user-driven events and with reference to a database of valid billing references, comprising:
 a client machine associated with a timekeeper, the client machine having a display screen and a first processor of the type suitable for executing software;
 an email server having a second processor of the type suitable for executing software; and
 the following software modules, each software module executing on at least one of the client machine and the email server;

an email parser module operative to extract syntactic structures from an email that is free of information which encodes or includes a billing reference;

an event handler module operative to detect a prescribed interaction with the email by the timekeeper using the client machine, the event handler including an action log that stores a current status of the email which identifies a state of the prescribed interaction with the email, wherein the state of the prescribed interaction with the email comprises one of "opened," "forward," or "reply";

a heuristic engine module communicatively coupled to the parser and operative to associate the email with the billing reference from the database using at least a portion of the extracted syntactic structures and to process and output information related to a header, a body, or both portions of the email;

an automated time-record entry generator module operative to construct the PTRE for the timekeeper so as to include at least: (i) the billing reference that has been associated with the email by the heuristic engine module, (ii) an hours-worked value in a time field, and (iii) information related to that email message in a narrative field of the PTRE which is different than the hours-worked value in the time field, wherein the automated time-record entry generator module is further operative to replace or modify the narrative field of a previously constructed PTRE to indicate the current status of the email and thereby indicate a degree of interaction by the timekeeper with the email in the narrative field of the PTRE, and wherein the information in the previously constructed narrative field is replaced or modified without user intervention using the output information of the heuristic engine related to the header, the body, or both portions of the email; and a user interface module operative to present, on the display screen associated with the timekeeper using the client machine, the constructed PTRE after the prescribed interaction has been detected and in view of the current status of the email, to receive an instruction from the timekeeper to accept, modify or cancel the PTRE, and to output any accepted or modified PTRE in response to the instruction.

2. The system as in claim 1, wherein the heuristic engine module operates upon the extracted syntactic structures to associate the email with a group of billing reference prospects, among which is the billing reference, and wherein the user interface module is further operative to present the constructed PTRE together with the group of billing reference prospects, to obtain a selection by the timekeeper of one of the billing reference prospects in the group, and to include the selected billing reference prospect as the billing reference in any outputted accepted or modified PTRE.

3. The system as in claim 1, further comprising a communications module operative to convey any prescribed interaction detected by the event handler module to the user interface module, and wherein the prescribed interaction is a manual interaction by the timekeeper with the email.

4. The system as in claim 1, wherein the email parser module operates to extract syntactic structures in response to the event handler module detecting a prescribed interaction by the timekeeper with the email.

5. The system as in claim 1, wherein at least one of the software modules executes on the email server while a remainder of the software modules executes on the client machine associated with the timekeeper.

6. The system as in claim 1, further comprising a management module operative to automatically store the email in a public document management system in accordance with the billing reference associated with any accepted or modified PTRE.

7. The system as in claim 1, further comprising configuration data associated with the timekeeper, wherein the heuristics engine causes different actions for different timekeepers on the basis of the configuration data.

8. The system as in claim 7, wherein the configuration data includes a time increment and wherein the automated time-record entry generator module is further operative to increment the hours-worked value in the time field of a previously constructed PTRE in response to a change in the current status of the email using the time increment.

9. The system as in claim 7, wherein the configuration data includes a "never bill" setting associated with one or more email senders, and wherein the heuristic engine module is operative to filter the prescribed interaction with the email from being provided to the automated time-record entry generator module in view of the "never bill" setting.

10. The system as in claim 1, wherein the user interface module is configured to provide a notification to the timekeeper once a threshold number of PTRE cancellation instructions have been received from the timekeeper concerning the same billing reference.

\* \* \* \* \*